Sept. 20, 1960     J. H. GARTNER ET AL     2,953,080

DISPENSING MACHINE

Filed Dec. 26, 1957     12 Sheets-Sheet 1

INVENTORS
John H. Gartner
Robert J. Bushfield
Edwin B. Cooley

BY

Attorneys

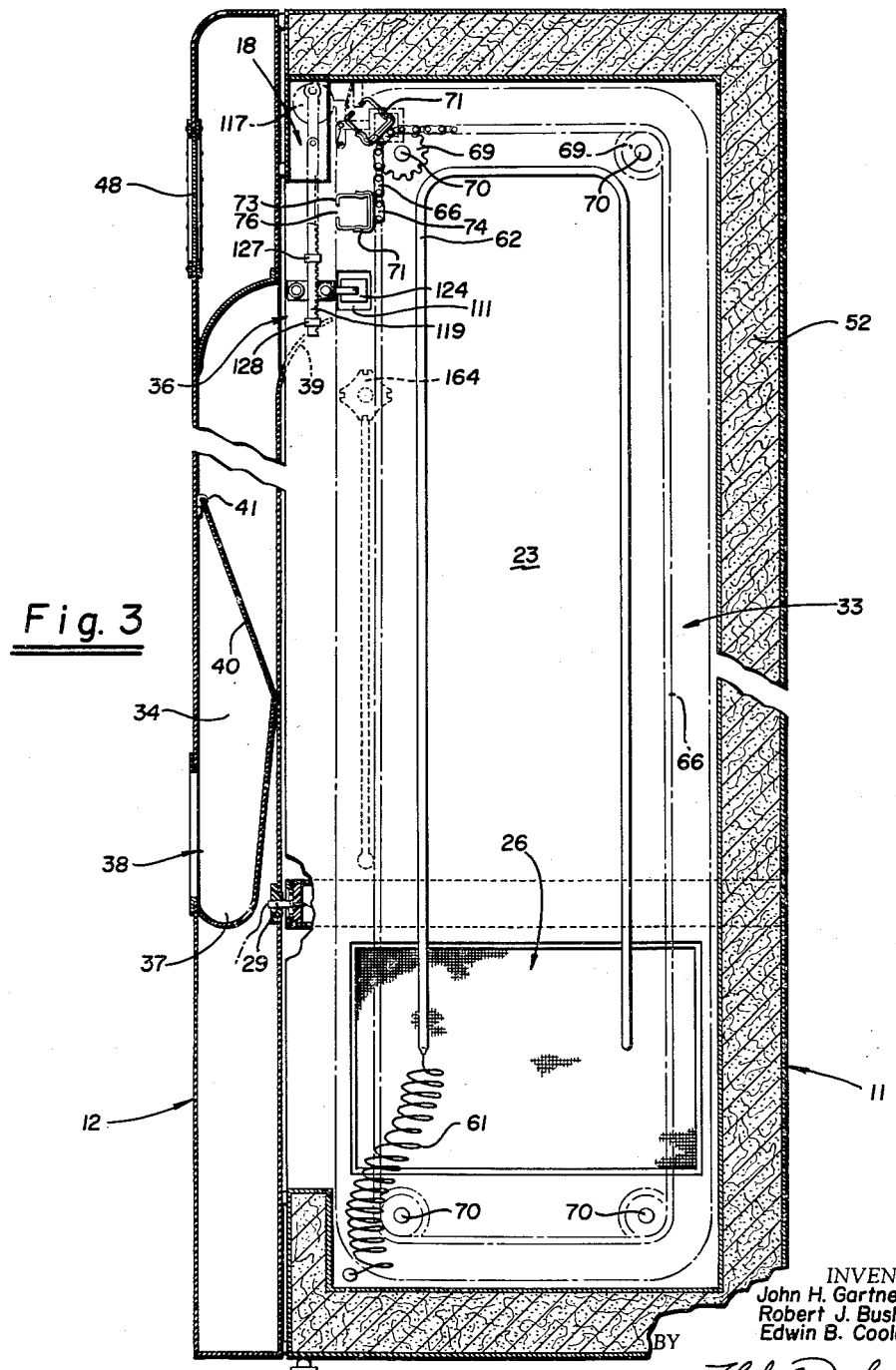

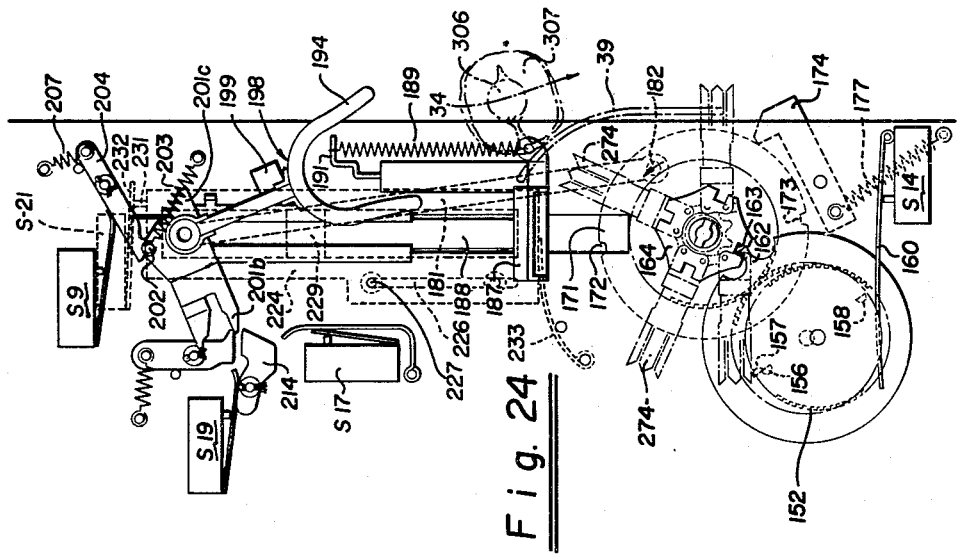
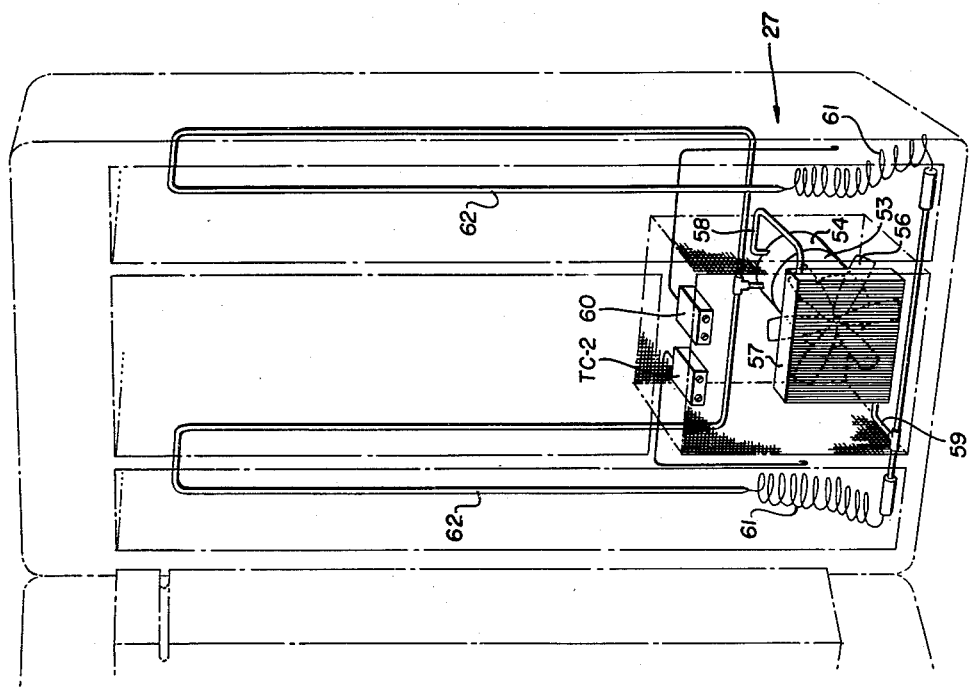

Sept. 20, 1960  J. H. GARTNER ET AL  2,953,080
DISPENSING MACHINE
Filed Dec. 26, 1957  12 Sheets-Sheet 5
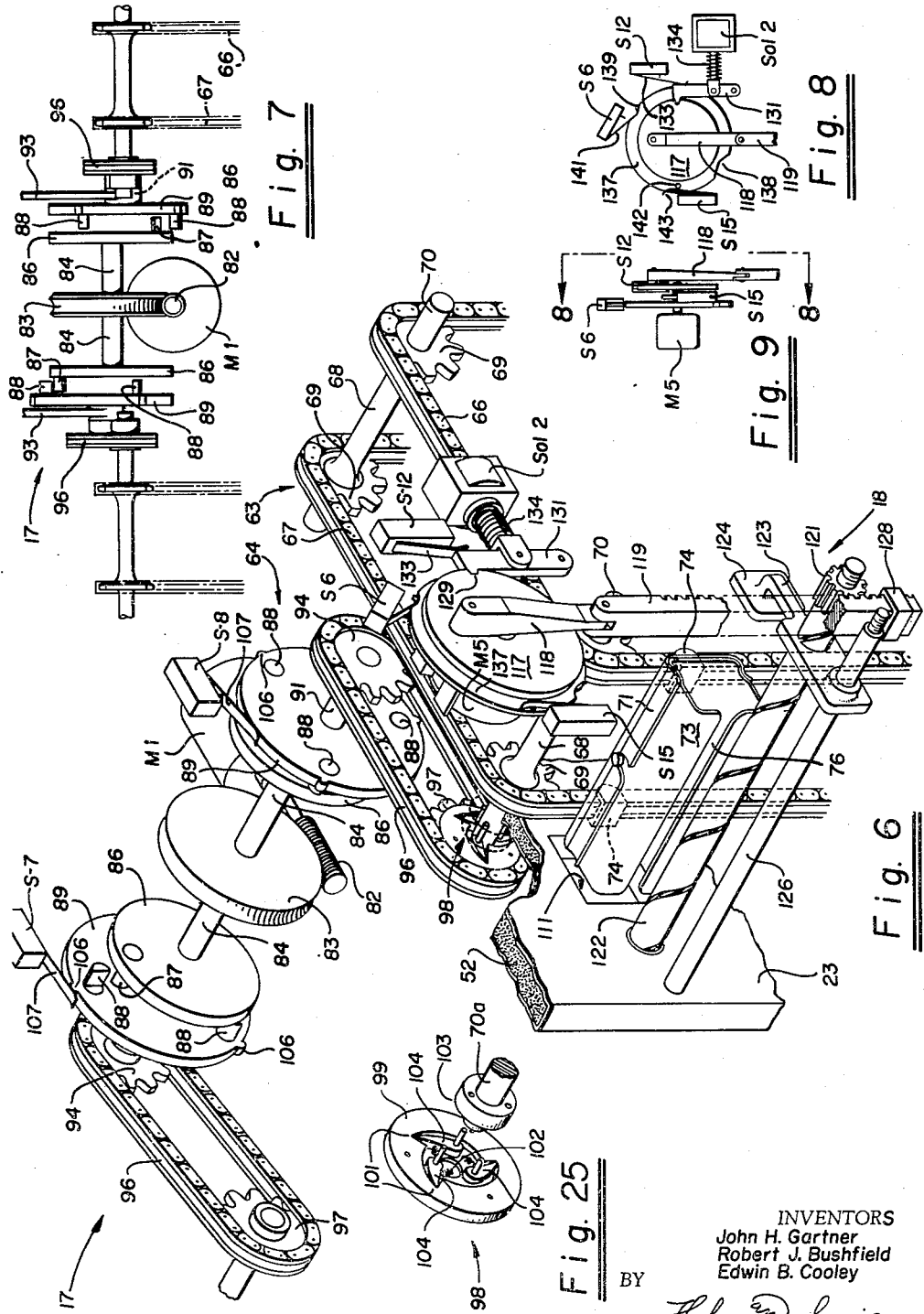
INVENTORS
John H. Gartner
Robert J. Bushfield
Edwin B. Cooley
BY
Attorneys Sept. 20, 1960     J. H. GARTNER ET AL     2,953,080
DISPENSING MACHINE
Filed Dec. 26, 1957     12 Sheets-Sheet 6
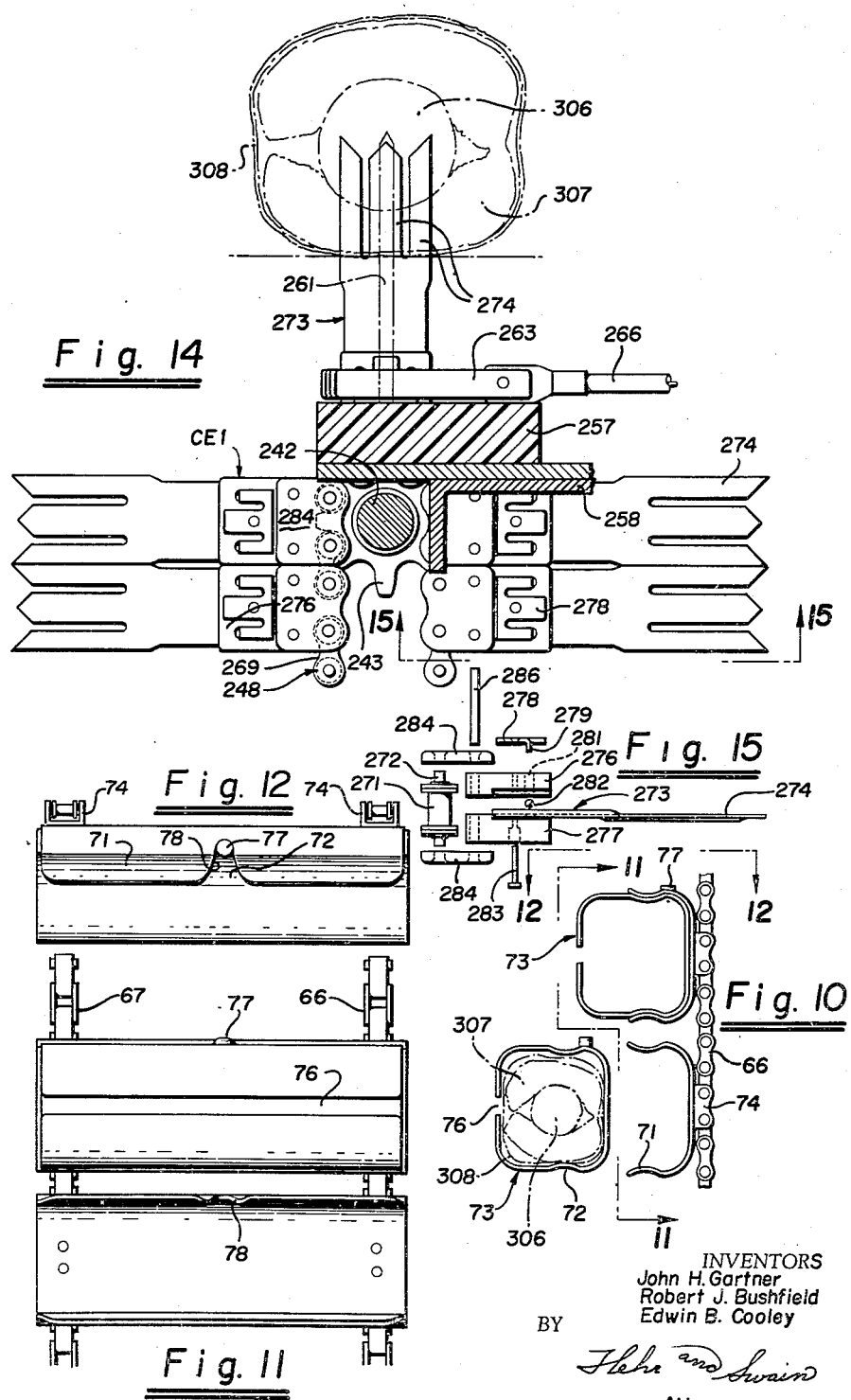
INVENTORS
John H. Gartner
Robert J. Bushfield
Edwin B. Cooley
BY
Attorneys

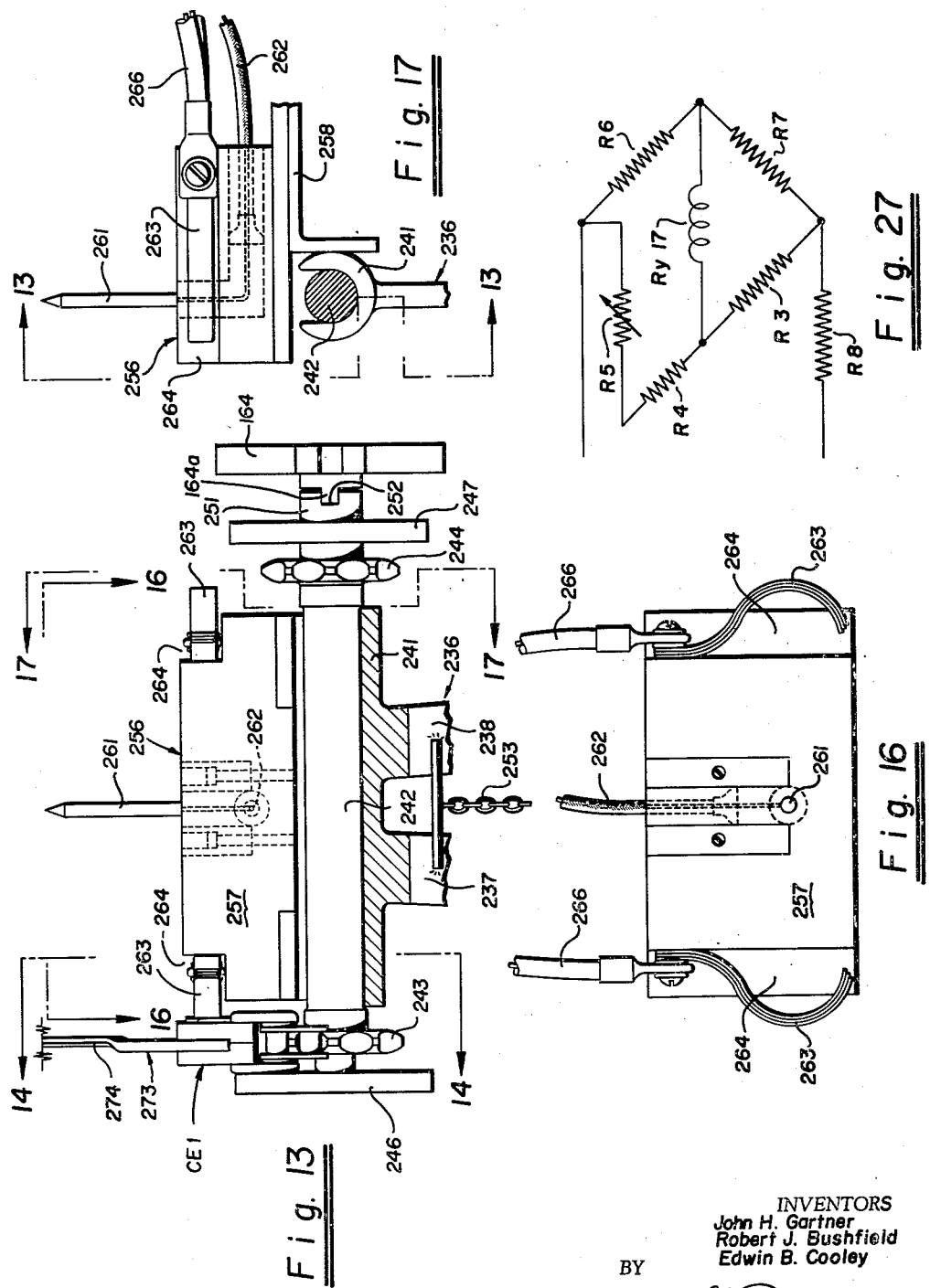

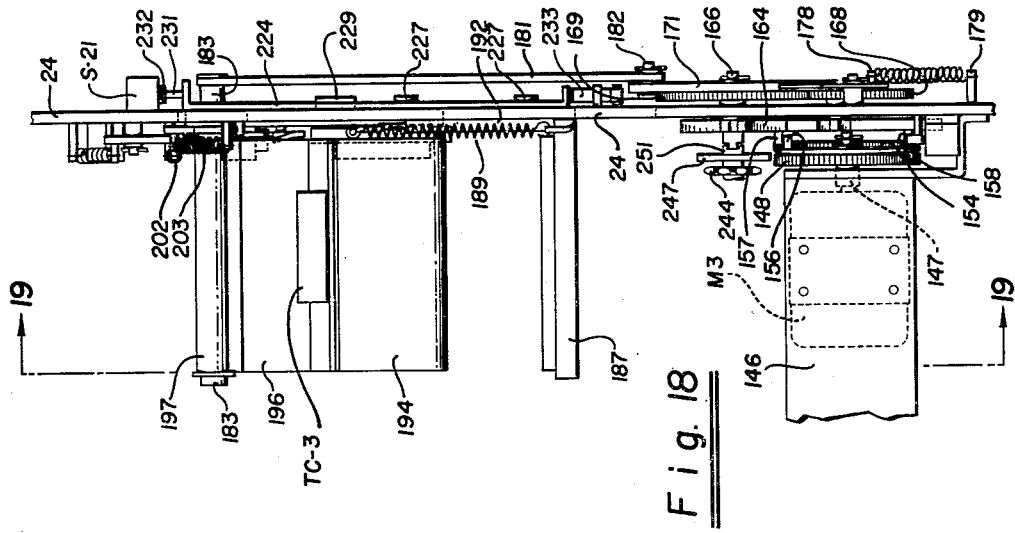

Sept. 20, 1960   J. H. GARTNER ET AL   2,953,080
DISPENSING MACHINE
Filed Dec. 26, 1957   12 Sheets-Sheet 9
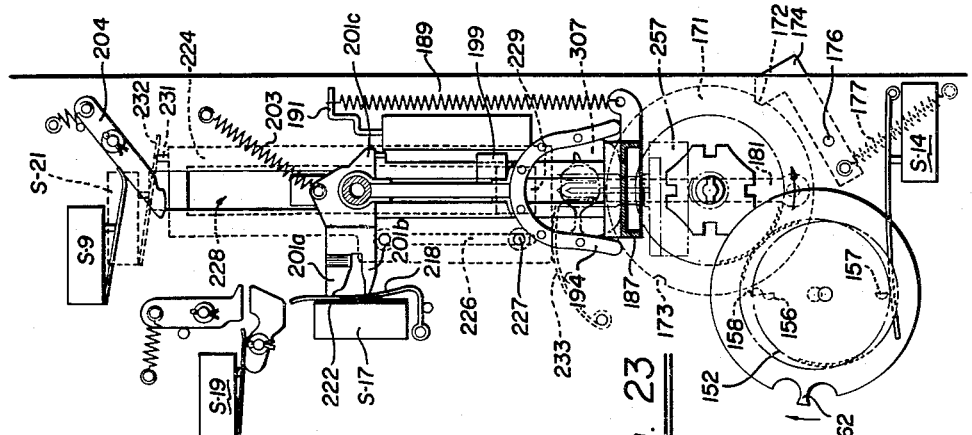
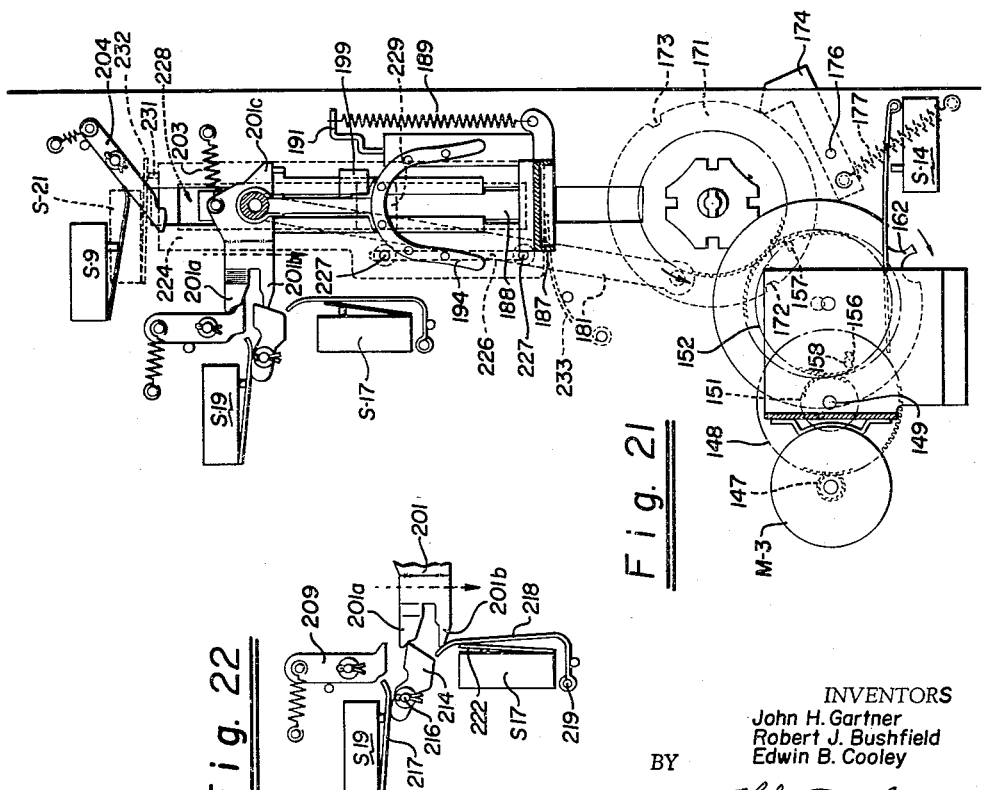
INVENTORS
John H. Gartner
Robert J. Bushfield
Edwin B. Cooley
BY
Attorneys

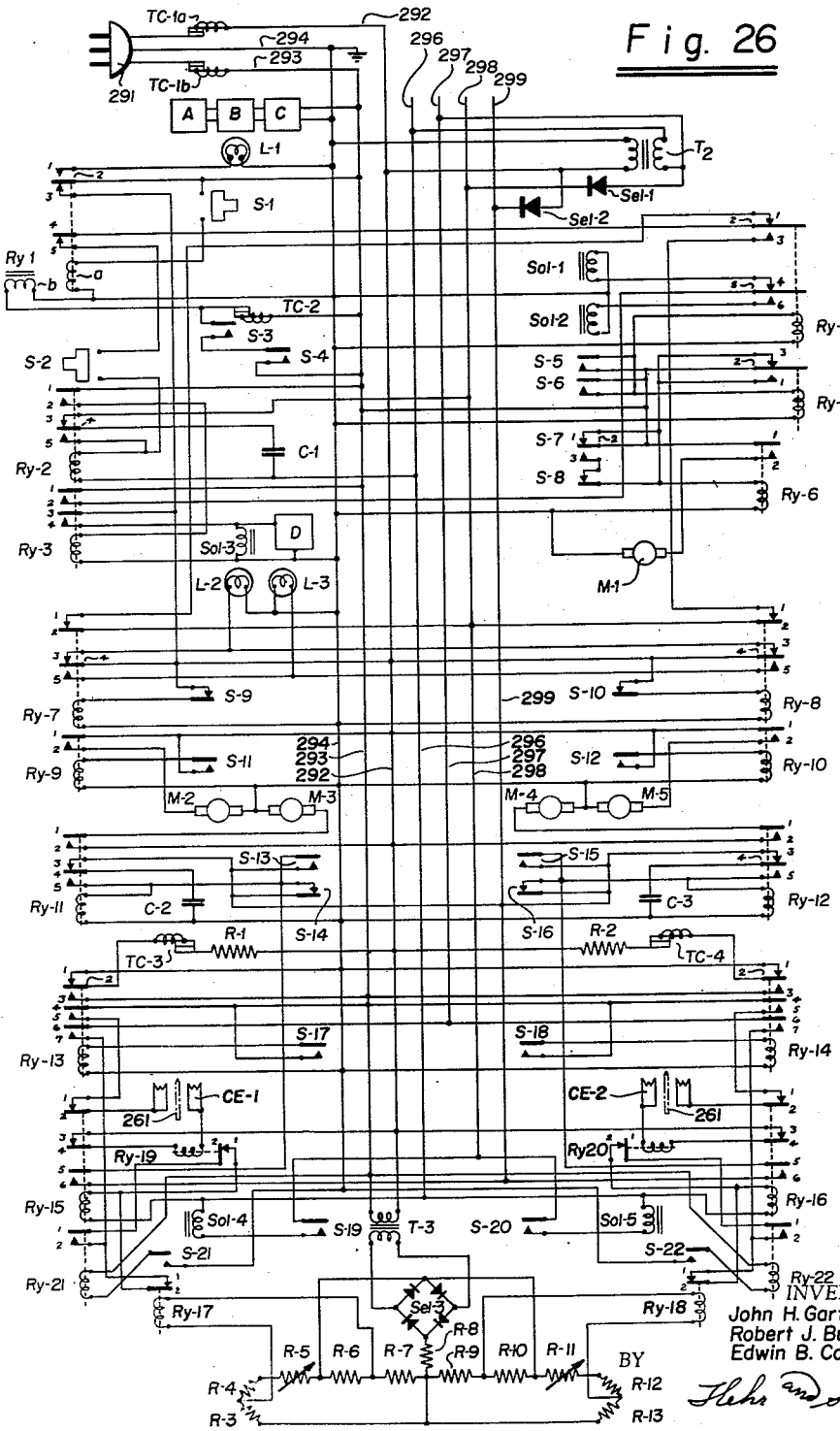

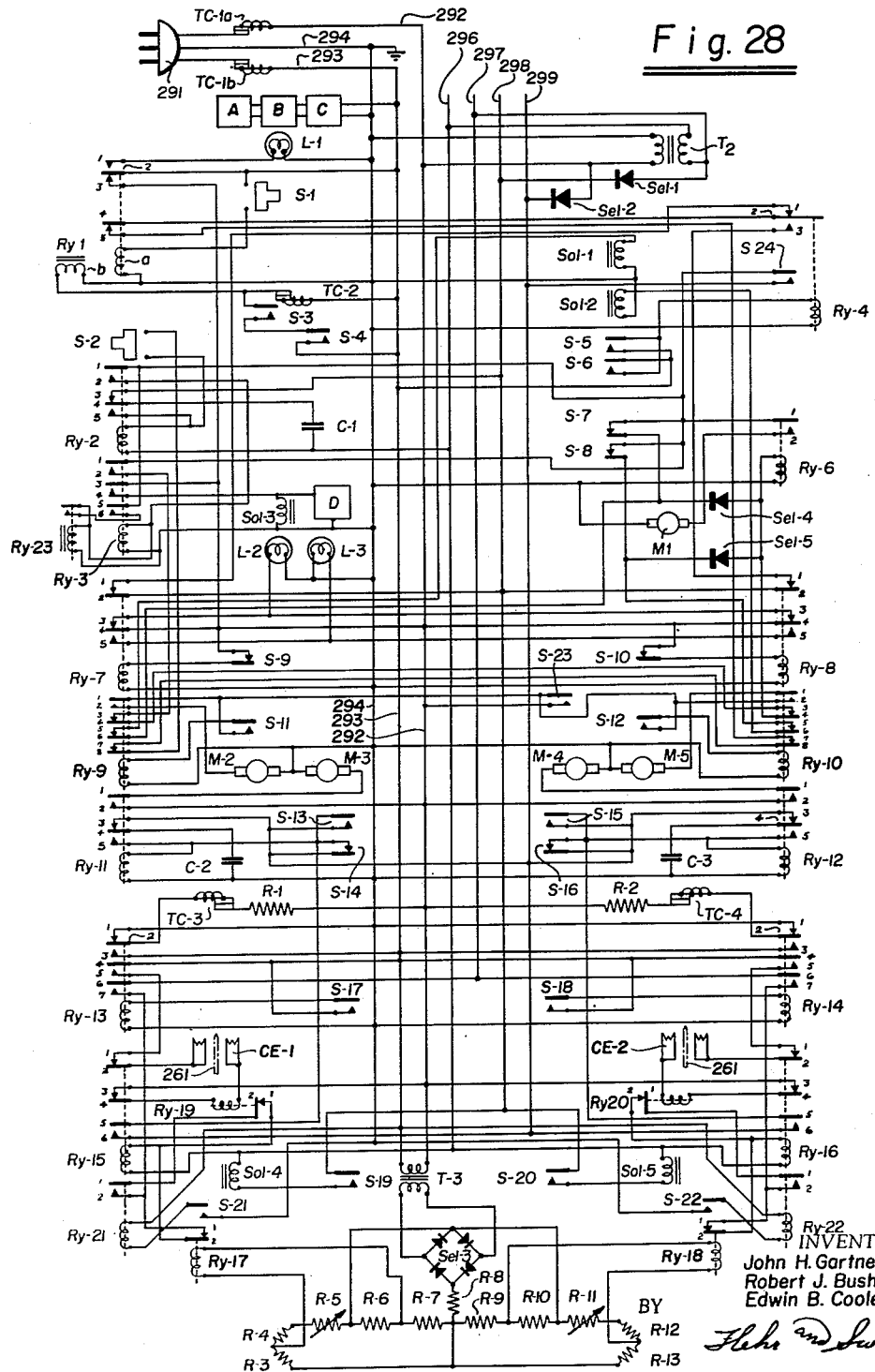

Sept. 20, 1960   J. H. GARTNER ET AL   2,953,080
DISPENSING MACHINE
Filed Dec. 26, 1957   12 Sheets-Sheet 12
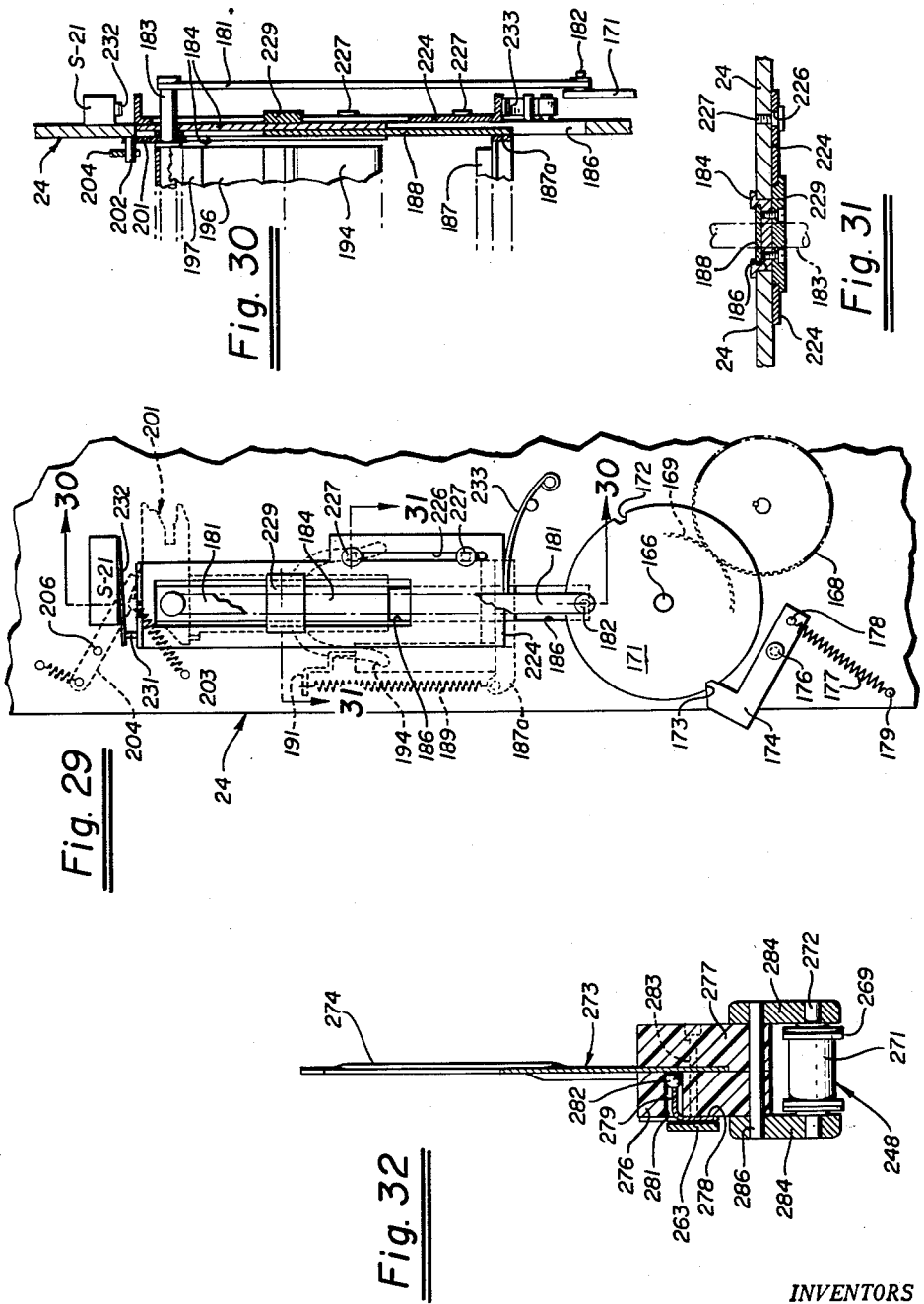
INVENTORS
John H. Gartner
Robert J. Bushfield
BY   Edwin B. Cooley
Attorneys United States Patent Office 2,953,080
Patented Sept. 20, 1960

2,953,080

DISPENSING MACHINE

John H. Gartner, Kentfield, Robert J. Bushfield, San Francisco, and Edwin B. Cooley, Whispering Pines, Calif., assignors to Speedway Foods Co., San Francisco, Calif., a corporation of California Filed Dec. 26, 1957, Ser. No. 705,330

14 Claims. (Cl. 99—326)

This invention relates generally to a dispensing machine and more particularly to a dispensing machine for heating frankfurters or hot dogs in split buns or rolls.

Heretofore dispensing machines have been provided for heating frankfurters or hot dogs by various methods of heating, however, difficulty has always been encountered in obtaining uniform cooking of the frankfurters. One of the primary difficulties is that the ingredients in the different frankfurters vary greatly. Thus, with conventional machines, one frankfurter may be undercooked while the next frankfurter may be overcooked. In the past such machines have not provided means for heating the split buns or rolls. In addition, such machines have been subject to numerous mechanical difficulties and have also met with objections from government authorities regulating the dispensing of food.

In general, it is an object of the present invention to provide a dispensing machine which will cook frankfurters within split buns.

Another object of the invention is to provide a machine of the above character in which the buns are heated at the same time.

Another object of the invention is to provide a machine of the above character which is fully automatic.

Another object of the invention is to provide a machine of the above character which is clean and sanitary.

Another object of the invention is to provide a machine of the above character in which the frankfurters are prepackaged in buns before they are placed in the machine.

Another object of the invention is to provide a machine of the above character in which the buns with the frankfurters therein can be preloaded into magazines which can be placed in the machine.

Another object of the invention is to provide a machine of the above character in which the frankfurters and buns are carried in refrigerated compartments.

Another object of the invention is to provide a machine of the above character in which the frankfurters are heated by passing electricity through them.

Another object of the invention is to provide a machine of the above character in which the cooking of the frankfurters is by controlled temperature regulation.

Another object of the invention is to provide a machine of the above character in which the frankfurters are heated by electrodes inserted in opposite ends of the frankfurter.

Another object of the invention is to provide a machine of the above character in which each frankfurter cooked is engaged by a different pair of electrodes.

Another object of the invention is to provide a machine of the above character in which more than one frankfurter can be cooked at a time.

Another object of the invention is to provide a machine of the above character which automatically ejects or discharges the cooked frankfurter and heated buns.

Another object of the invention is to provide a machine of the above character in which the cooking time is determined by measuring the interior temperature of the frankfurter intermediate the cooking electrodes.

Another object of the invention is to provide a machine of the above character which gives an indication of whether the machine is "ready," "heating" or "sold out."

Additional objects and features of the invention will appear from the following description in which the preferred embodiments have been set forth in detail in conjunction with the accompanying drawing.

Referring to the drawing:

Figure 3 is an enlarged cross-sectional view taken across one side of the dispensing machine;

Figure 5 is an elevational view of the automatic dispensing machine particularly showing the refrigeration system;

Figure 6 is a partial isometric view of the apparatus for operating the elevators and the apparatus for operating the transfer mechanism;

Figure 7 is a front elevational view of the apparatus for operating the elevators;

Figure 8 is a reduced side elevational view of a portion of the apparatus for operating the transfer mechanism;

Figure 9 is a side elevational view of the apparatus shown in Figure 8;

Figure 10 is a side elevational view of a portion of one of the elevators;

Figure 11 is a view taken along the line 11—11 of Figure 10;

Figure 12 is a view taken along the line 12—12 of Figure 10;

Figure 13 is a partial cross sectional view taken along the line 13—13 of Figure 17 showing a portion of the electrode or fork advancing mechanism;

Figure 14 is a cross sectional view taken along the line 14—14 of Figure 13;

Figure 15 is an exploded view taken along the lines 15—15 of Figure 14 showing the assembly of one of the forks;

Figure 16 is a cross sectional sectional view taken along the line 16—16 of Figure 13;

Fig. 17 is a cross sectional view taken along the line 17—17 of Figure 13;

Figure 18 is a front elevational view taken along the line 18—18 of Figure 19 and showing the oven raising and lowering mechanism;

Figure 19 is a side elevational view taken along the line 19—19 of Figure 18 showing the position of the oven operating apparatus in its uppermost position;

Figure 20 is a cross sectional view taken along the line 20—20 of Figure 19 showing the position of the operating pawls for the switches;

Figure 21 is a view similar to Figure 19 but showing the position of the oven operating mechanism during the oven lowering operation;

Figure 22 is a partial view of the oven operating mechanism showing the operation of switches during downward travel of the oven;

Figure 23 is a view similar to Figures 19 and 21 and shows the position of the oven operating mechanism when the oven is in its lowermost or cooking position.

Figure 24 is a view similar to Figure 23 and shows the positon of the oven operating mechanism during raising of the oven and during ejection of the frankfurter and bun;

Figure 25 is an exploded enlarged view of the ratchet clutch.

Figure 26 is the circuit diagram for the dispensing machine;

Figure 27 is a rearrangement of a portion of the circuit diagram of Figure 26 showing a conventional Wheatstone bridge arrangement; and Figure 28 is a circuit diagram of another embodiment of our invention.

Figure 29 is a vertical elevational view of the oven slide mechanism.

Figure 30 is a vertical cross sectional view taken along the line 30—30 of Figure 29.

Figure 31 is a horizontal cross sectional view taken along the line 31—31 of Figure 29.

Figure 32 is a cross sectional view of one of the fork electrodes.

Figure 2:
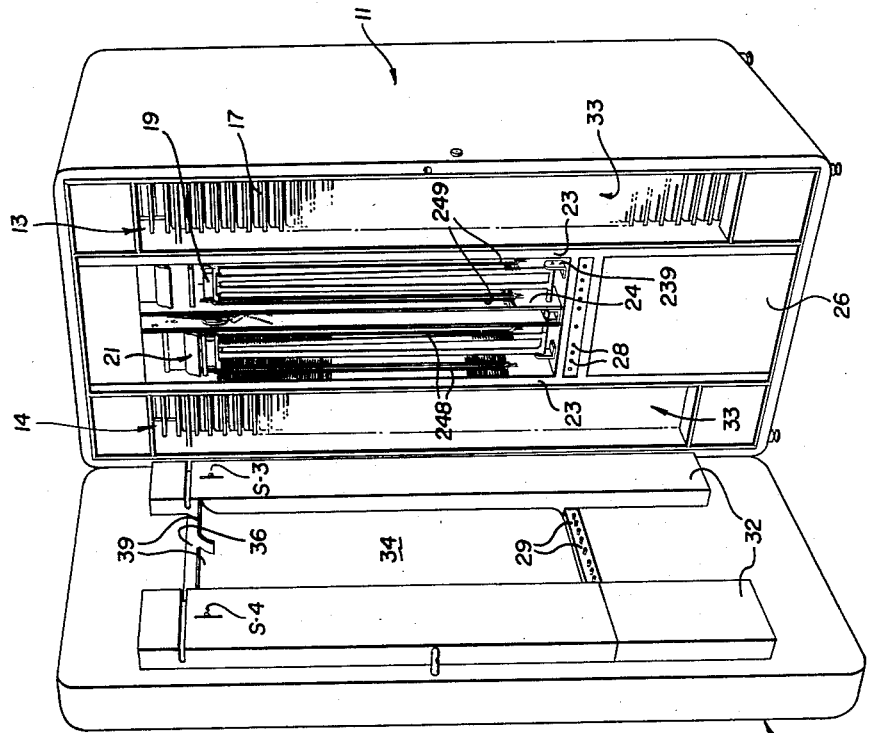
Figure 2 is an isometric view of the automatic dispensing machine shown in Figure 1 with the front door in an open position.
Figure 1:
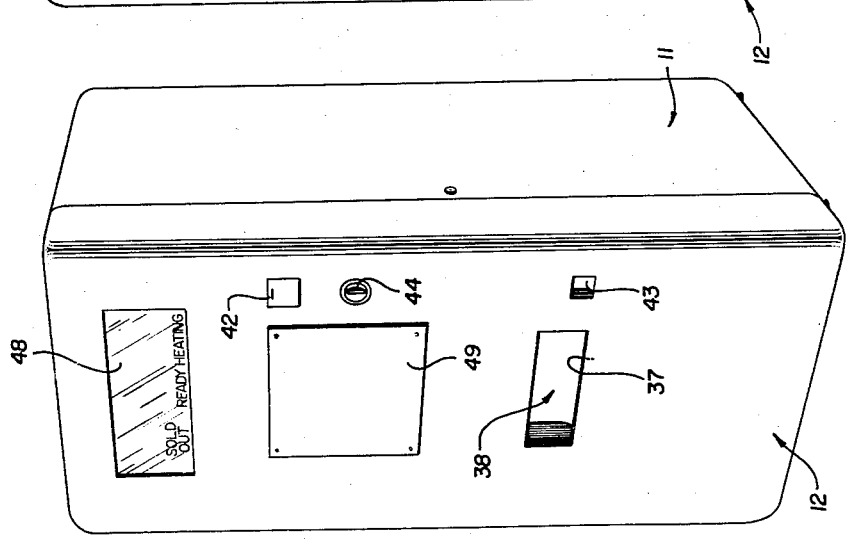
Figure 1 is an isometric view of a frankfurter or hot dog dispensing machine embodying the present invention.

The automatic dispensing machine shown in the drawing consists generally of a cabinet 11 with a hinged front door 12. Mounted within the cabinet are right and left hand dispensing assemblies 13 and 14, respectively, which are mounted in the right and left hand sections of the cabinet. Each of the dispensing assemblies consists generally of an elevator mechanism 17, a transfer mechanism 18, an electrode mechanism 19, and an oven mechanism 21, as hereinafter described.

Partitions 23 and 24 are provided in each of the right and left hand sides of the cabinets for a purpose hereinafter described. A compartment 26 is provided in the lower portion of the cabinet and contains the refrigeration system 27. A plurality of female receptacles 28 are provided within the cabinet and are adapted to be engaged by the male plugs 29 carried by the door 12 when the door is closed. The female receptacles and male plugs are utilized for forming connections between electrical components in the door and in the cabinet hereinafter described.

The door is provided with a pair of rectangular sectons 32 which is adapted to seat in the elevator compartments 33 formed between the side walls of the cabinet and the partitions 23. A chute 34 is provided in the door and its upper end terminates in an inlet opening 36. Its lower end terminates in a receptacle 37 which can be reached through an opening 38 in the door. The upper end of the chute 34 is provided with a lip 39 which is adapted to receive the frankfurters and buns as hereinafter described. A spring loaded trap door 40 pivoted at 41 is provided in the chute to prevent the entry of vermin through the chute.

Suitable coin receiving apparatus is mounted in the door and as shown is mounted in the right hand side of the door and includes a coin receiving slot 42, a return coin receptacle 43 and a knob 44 for operating a coin reject mechanism. One type of coin apparatus found to be satisfactory included an accumulative box manufactured by the Rowe Vending Machine Company, and a coin rejecting mechanism manufactured by National Rejectors, Inc. of St. Louis, Missouri.

Animated display means (not shown) which includes the transparent member 48 mounted in the upper portion of the machine is provided in the upper portion of the door. Visual indicating means hereinafter described is mounted behind the transparent member 48 and serves to give visual indication to a customer of the machine to tell the customer whether the machine is "sold out," "ready" or "heating." The door is also provided with an area 49 which may be utilized for advertising material.

The walls of the cabinet and the front door as well as the partitions 23 are provided with suitable insulation 52 so that the elevator compartments 33 may be kept at a predetermined refrigerated temperature by the refrigeration system 27.

The refrigeration system is substantially conventional and consists of a compressor motor 53 which drives an integral compressor unit 54. The motor also drives a fan 56 which blows air through a condenser 57. The refrigerant passes through piping 58 into the condenser 57 and then through piping 59 into capillary tubes 61 and into expansion tubes 62 back to the compressor unit. The expansion tubes, as shown, pass through the compartments 33. A suitable control device 60 is provided to cause operation of the refrigeration system in a manner well known to those skilled in the art and to maintain the temperature in the compartments 33 at a predetermined refrigerated temperature. An additional control device TC2 is provided to disable the machine when the temperature in the machine exceeds a certain level as hereinafter described.

The various mechanisms 17, 18, 19 and 21 will now be described. However, the mechanisms for only one side of one of the dispensing assemblies will be described since both are substantially identical.

*Elevator mechanism*

Each of the elevator mechanisms 17 consists of an elevator 63 and an elevator drive 64. The elevator is comprised of a pair of endless chains 66 and 67 which are of a type well known to those skilled in the art. The endless chains pass over sprockets 69 which are integral parts of spools 68 which are rotatably mounted on shafts 70. The shafts are positioned in the four corners of the compartments 33 and mounted in the sidewalls of the cabinet and the partiton 23. Thus, as shown, particularly in Figure 3, the endless chains travel through a substantially rectangular path within the compartment 33.

A plurality of magazine retainers or holders 71 is mounted at spaced intervals on the endless chains 66 and 67. The magazine retainers, as shown, are substantially U-shaped in section and have their outer legs or ends bent inwardly in a curved fashion and adapted to cooperatively engage grooves 72 in opposite sidewalls of magazines 73. The magazine retainers are fastened to the endless chains by suitable means such as adapter plates 74 which can be welded to the magazine retainers and riveted to the endless chain as shown. Each of the magazine retainers is fixed to each of the chains 66 and 67 at right angles to the path of travel of the chains. The magazine retainers 71 may be formed of any suitable material, however, it is desirable to form the retainers of a spring material such as spring metal so that the ends of the retainers may yieldably retain the magazines.

The magazines 73 are substantially square in cross section and are open at both ends. The front wall of the magazine is provided with a slot 76 which extends the entire length of the magazine for a purpose hereinafter described. A pin 77 (Figure 10) is mounted on the top wall of the magazine adjacent the rear wall of the magazine and is adapted to cooperate with a wide-mouthed slot 78 provided in the upper leg of the magazine retainer. The pin 77 cooperating with the slot 78 serves to align the magazine with respect to the magazine retainer when the magazine is snapped into position.

The drive mechanism 64 (Figures 6 and 7) consists of a motor M1 which drives a worm 82. The worm 82 drives a worm gear 83 which is fixed intermediate the ends of a shaft 84. A pair of driven discs 86 is mounted on opposite ends of the shaft 84 and carries a single pin 87 adjacent their outer margins and extending at right angles from the driven discs. Each of the pins 87 is adapted to engage three pins 88 spaced 120° apart and mounted on the outer margins of a driven disc 89 which is fixed to one end of a shaft 91. The shaft 91 is mounted off-center with respect to the shaft 84 for a purpose hereinafter described.

The shaft 84 is rotatably mounted in the partitions 24 whereas the shaft 91 is rotatably mounted in a bearing bracket 93. A sprocket wheel 94 is mounted on the other end of the shaft 91 and drives a chain belt 96. The chain belt drives a sprocket wheel 97 which includes a ratchet clutch 98 which is an integral part thereof.

The ratchet clutch 98 consists of a disc 99 fixed to the sprocket 97. The disc is provided with three tooth-shaped recesses 101 spaced 120° apart, and a circular centrally located recess 102. A circular member 103 is adapted to rotate in the recess 102 and is carried by a shaft extension 70a of the shaft 70 provided in the upper front portion of the compartment 33. The circular member carries three pawls 104 which are pivotally mounted on the circular member 103 and spaced 120° apart. As is well known to those skilled in the art, the ratchet clutch 98 will drive the elevator mounted on the shaft 90 in one direction and will permit free running of the elevator in the same direction to permit loading of the elevator as hereinafter described.

When the motor M1 is operated, the pins 87 and 88 on the driving disc 86 and the driven disc 89 which also may be called Geneva pin wheels will cause movement of the elevators. The driven disc or Geneva pin wheels are so arranged that each time the elevator motor M1 is energized, the driven disc 89 will be rotated through 120°. As is well known to those skilled in the art, since the driven disc 89 is provided with three pins and the driving disc 86 is provided with a single pin and since the discs rotate on centers which are spaced from each other equal to the diameter of the pins, the pin 87 will engage one of the pins 88 on the disc 89 and will cause the disc 89 to be rotated through 120° after which time it will release the pin it has engaged.

The driven disc 89 is provided with projections 106 which are adapted to engage the operating lever 107 of a switch which is switch S7 for the left hand elevator and switch S8 for the right hand elevator. As hereinafter explained, the switches S7 and S8 serve to turn off the elevator motor M1 each time the associated driven disc 89 has been rotated through 120°. There may be some overrun because the motor M1 is not provided with a brake, but this is not undesirable since the pin 87 on the driving disc 86 must rotate another 120° before it engages another pin 88 on the driven disc 89. For that reason there is adequate distance for the motor M1 and associated gearing to coast to a stop.

The pins in the drive mechanism for the right and left elevators are so timed that first one elevator is operated and then the next. The timing of the elevators is thus mechanical rather than electrical. Each time the right or left elevator is operated, the elevator is moved so that one of the magazines 73 is in line with oven loading openings 111 provided in the partitions 23. Thus, each time the elevators are operated, successive magazines are placed at the elevator loading opening 111 so that the contents of the magazine can be pushed into the oven through the oven loading opening 111 by a transfer mechanism hereinafter described.

Transfer mechanism

Figure 4:
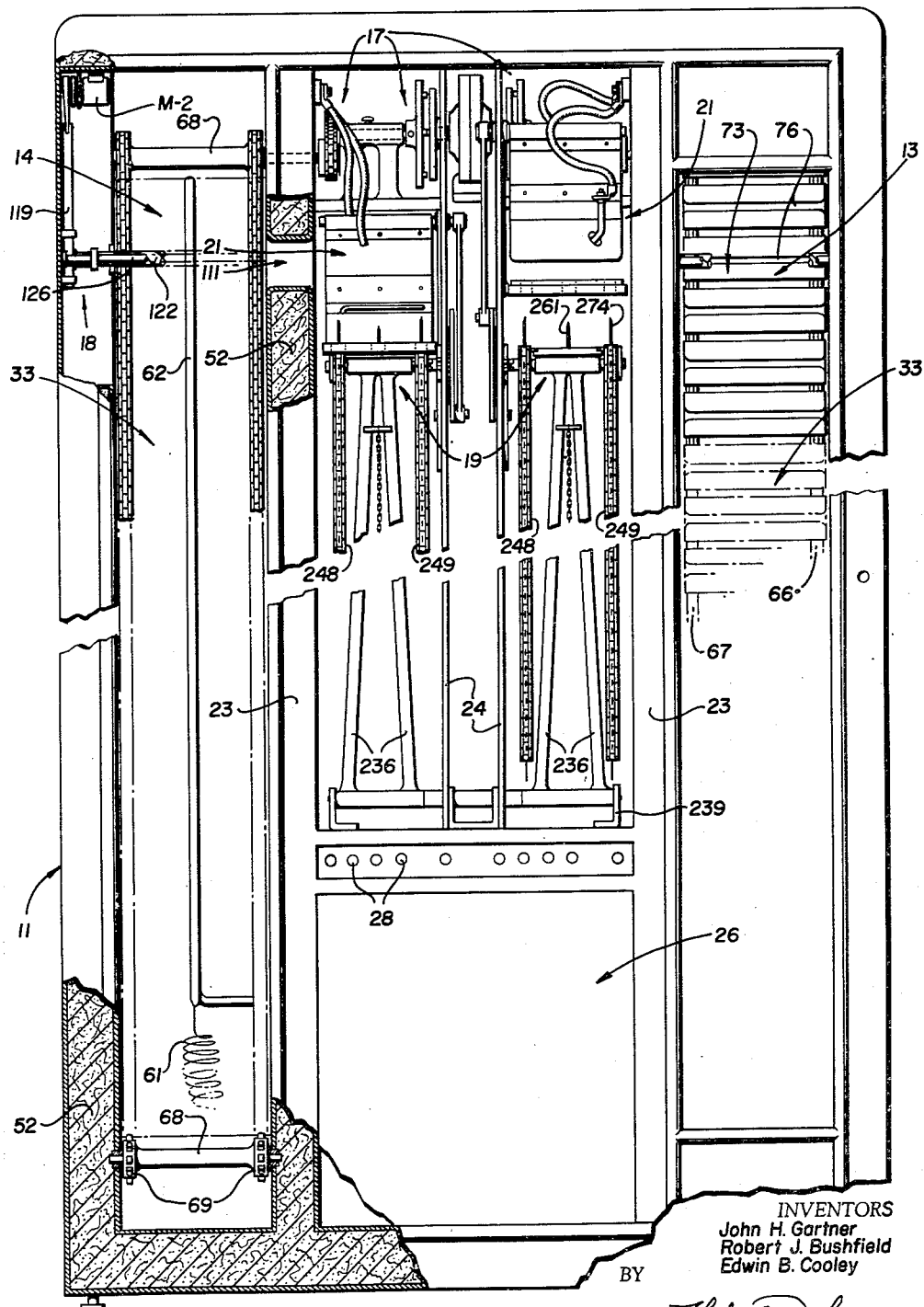
Figure 4 is an enlarged partial front elevational view of the dispensing machine with the front door open.

The transfer mechanism 18 is substantially identical for each of the dispensing assemblies 13 and 14 and consists of a gearmotor which will be designated as transfer drive motor M2 (Figure 4) for the left dispensing assembly and transfer drive motor M5 (Figure 6) for the right dispensing assembly. The gearmotor drives a disc 117 which carries a pitman 118 that has one end pivotally mounted off center on the disc 117. The other end of the pitman 118 is pivotally connected to a rack 119 which depends from the crank arm 118. The rack drives a pinion 121 which is fixed to one end of a threaded spindle 122. The spindle 122 is rotatably mounted between the sidewalls of the cabinet and the partition 23. The spindle 122 threadably engages a pusher arm 123 intermediate the ends of the pusher arm. One end of the pusher arm is substantially narrower than the other portion of the arm and carries a pusher plate 124 which is of such dimensions that it may travel through the magazines 73 as hereinafter described. The narrow portion of the arm 123 is adapted to travel in the slot 76 provided in each of the magazines.

The other end of the pusher arm 123 opposite the ends to which the pusher plate is attached is slidably mounted on a guide rod 126 which is also mounted between the partition 23 and the sidewall of the cabinet. Suitable means is provided for maintaining the rack 119 in continuous engagement with the pinion 121 and consists of guide members 127 and 128 (Figures 3 and 6) which are fixed to the sidewall of the cabinet.

It is readily apparent that as the disc 117 is rotated by the associated gearmotor, vertical reciprocation of the rack 119 will occur which will cause rectilinear movement of the pusher plate 124 for a purpose hereinafter described. The diameter of the disc 117 and the placement of the off-center connection of the pitman 118 relative to the disc 117 are so chosen that the pusher arm 123 is advanced substantially the complete length of the spindle 122 and then retracted. Thus, the disc 117 need only rotate through one complete revolution to cause the advancement and retraction of the pusher arm 123.

The disc 117 is provided with a notch 129 in its outer periphery which is adapted to be engaged by detent 131 which has its lower end pivotally connected relative to the sidewall of the cabinet. The detent 131 is adapted to be moved between engaging and releasing positions by a solenoid which is designated as SOL1 for the left dispensing mechanism and SOL2 for the right dispensing mechanism. The operating lever 133 of a switch S11 for the left dispensing mechanism and switch S12 for the right dispensing mechanism is operated by the pawl 131. A spring 134 mounted on the solenoid serves to urge the pawl 131 into engaging position with the disc 117.

As shown in the drawing (Figures 6 and 8), an additional disc 137 is driven by the associated gearmotor and at the same speed as disc 117. The disc 137 is provided with a pair of notches 138 and 139 which are adapted to be engaged by an operating lever 141 of an elevator bypass switch which may be designated as S5 and S6, respectively, for the left and right dispensing assemblies. Thus, it is apparent that each time the disc 117 is rotated, the associated switch S5 or S6 will be operated twice.

The disc 137 is provided with a pin 142 adjacent its outer margin which is adapted to engage an operating lever 143 of an oven starting switch which may be termed S13 and S15, respectively, for the left and right hand dispensing assemblies. It will be noted that the oven starting switch will be operated only once for each rotation of the disc 137.

Oven mechanism

The oven mechanism is shown particularly in Figures 18 through 24 and consists of a motor which will be designated as M3 for the left hand dispensing assembly and M4 for the right hand dispensing assembly. The oven motor is mounted on a bracket 146 and carries a pinion 147 on its output shaft. The oven motor is of a fan-type well known to those skilled in the art in which when the motor is turned on and off, the output shaft moves axially. Thus, when the oven motor is turned on, the pinion 147 is moved into engagement with a spur gear 148. The spur gear 148 is fixed to a shaft 149. A pinion 151 is also fixed to the shaft 149 and thus is driven as the spur gear 148 is rotated. The pinion 151 drives a spur gear 152 which is mounted on a shaft 153. The spur gear 152 carries a disc 154 which is of slightly smaller diameter than the spur gear 152. The disc 154 carries a pin 156 mounted near its outer margin. The pin 156 is adapted to engage pins 157 and 158 carried on the outer margin of a disc 159 which is of substantially larger diameter than the disc 154. Disc 159 is mounted on a shaft 161 which is mounted so that its axis is off center with respect to the axis of shaft 153. The discs 154 and 159 and the pins associated therewith form a Geneva pin gear movement, the operation of which is well known to those skilled in the art. The axes 153 and 161 must be off center a distance equal to the diameter of the pins 156 and 157 and 158. With every one revolution of the disc 154, the disc 159 is rotated one-half a revolution. For example, rotation of disc 154 and the pin 156 rotates the pin 157 and the disc 159 until the pin 156 no longer engages the pin 157. The pins 157 and 158 are also adapted to engage an operating lever 160 of a switch which for the left dispensing assembly is oven limit switch S14 and for the right dispensing assembly is oven limit switch S16.

The disc 159 is formed with a tooth 162 which is adapted to engage notches 163 in a Geneva member 164. The Geneva member 164 is mounted on a shaft 166 for rotation thereon and is provided with arcuate surfaces 167 on its outer periphery. The arcuate surfaces 167 are adapted to be engaged by the outer periphery of the disc 159. The disc 159, therefore, serves to hold the Geneva member 164 in a proper position so that the proper notch 163 can be engaged by the tooth 162. Since the Geneva member 164 is provided with four notches 163 and four arcuate surfaces 167, each time the tooth 162 engages one of the notches 163, the Geneva member 164 will be rotated through 90°. The Geneva member 164 is provided with an extension 164a which drives a fork assembly 19, as hereinafter described.

The shaft 161 which carries the disc 159 is rotatably mounted in the partition 24 and, as previously explained, is fixed to the disc 159. A spur gear 168 is fixed to the shaft 161 on the side of the partition 24 opposite that of disc 154. The spur gear 168 drives a spur gear 169 which is fixed to the shaft 166. The shaft is rotatably journalled in partition 24 and rotatably carries the Geneva member 164. The spur gear 169 carries a disc 171 which is of a diameter larger than the diameter of the spur gear 169. The disc 171 is provided with two notches 172 and 173 formed on the outer periphery of the disc and spaced 180° apart. The notches are adapted to be engaged by a pawl 174 which is pivotally connected to the partition 24 at 176 and is yieldably urged into engagement with the disc 171 by a spring 177 which has one end connected to the pawl at 178 and the other end connected to the partition 24 at 179.

A crank arm 181 has its lower end pivotally connected to the outer margin of the disc 171 at 182. The upper end of the crank arm 181 is pivotally connected to one end of an oven supporting rod 183. The oven supporting rod 183 is mounted in a journal block 184 which is slidably accommodated in a vertical slot 186 for vertical rectilinear movement in the slot.

A horizontal oven platform 187 is provided and is carried by a vertical member 188. The vertical member 188 is slidably mounted in the journal block 184 for movement longitudinally of the journal block. The oven platform and its vertical member 188 are yieldably urged upwardly relative to the journal block 184 by a spring 189 which has one end connected to an extension 187a of the oven platform. The other end of the spring is connected to a pin 191 which is mounted on a block 192 fixed to the partition 24. The block 192 is adapted to engage the extension 187a of the oven platform and serves as a stop to prevent further upward travel of the oven platform.

An oven cover 194 substantially semicircular in cross section is provided and is fixed to a member 196 of suitable insulating material such as Micarta. The insulating member 196 is pivotally mounted on the oven supporting rod 183 by hinge members 197. The oven cover 194 is provided with a suitable heating unit 198, the temperature of which is controlled by an adjustable thermostat which for the left dispensing assembly will be designated as TC3 and for the right dispensing assembly as TC4.

An oven operating lever 201 is mounted on one of the hinge members 197 and is provided with two projecting jaw-like portions 201a and 201b. The oven operating lever is provided with a pin 202 on its upper extremity to which is attached one end of a spring 203. The other end of the spring 203 is fixed to the partition 24 as shown. It is readily apparent that the spring serves to retain the oven cover 194 in a position in which it overlies the oven platform 187. The operating lever 201 is provided with a lip portion 201c (Figures 19 and 21) which is adapted to engage the journal block 184 to prevent the spring 203 from moving the oven cover 194 beyond the position shown in Figure 19.

The pin 202 is adapted to be engaged by a catch 204 which is pivotally mounted on the partition 24 at 206 and which is yieldably urged into engagement with the pin 202 by a spring 207 one end of which is connected to the catch and the other end is connected to the partition 24 as shown. The catch 204 is adapted to engage operating lever 208 of a switch which for the left hand dispensing assembly will be termed the left indicator switch S9, and for the right hand dispensing assembly, the right indicator switch S10.

A pawl 209 is pivotally mounted on the partition 24 at 211 and is yieldably urged against a stop 212 by a spring 213 which has one end connected to the pawl 209 and the other end connected to the partition 24. Another pawl 214 is pivotally mounted on the partition 24 at 216 and is adapted to engage the operating lever 217 of a switch which for the left hand dispensing assembly will be termed the left thermostatic control switch S19, and for the right hand dispensing assembly, the right thermostatic control switch S20. An operating member 218 is pivotally mounted on the partition 24 at 219 below the pawl 214 and normally rests against the stop 221. The operating member 218 is adapted to cause actuation of the operating lever 222 of a switch which for the left dispensing assembly will be termed left power switch S17, and for the right dispensing assembly, right power switch S18.

It should be pointed out that the portions 201a and 201b of the pawl 201 are offset laterally as shown in Figure 20 to operate the proper switches as hereinafter described.

A slide member 224 is mounted on the side of the partition 24 opposite the side in which the oven cover is mounted and is slidably mounted relative to the partition 24. The slide member is provided with an elongated slot 226 (Figure 23) which accommodates guide screws 227. The guide screws are so spaced that vertical movement of the slide member 224 is possible relative to the guide screws 227. The slide member 224 is also provided with a rectangular slot 228 which slidably engages a rectangular washer 229 which forms a part of the journal block 184. The slide member 224 carries an operating pin 231 which engages the operating lever 232 of a switch which for the left dispensing assembly may be termed left time delay switch S21, and for the right dispensing assembly may be termed right time delay switch S22. The slide member 224 is held in a normally raised position by a leaf spring 233.

*Electrode mechanism*

The electrode mechanism is shown in Figrues 2, 12, 13, 14, 15, 16 and 17, and consists primarily of an electrode supporting arm 236 which is comprised of two substantially vertical members 237 and 238. The lower ends are pivotally mounted between the partition 24 and a bracket 239. The upper ends of the vertical members 237 and 238 are joined together and carry a yoke-like receiving portion 241. The yoke-like receiving portion 241 rotatably accommodates a shaft 242 which carries a pair of electrode supporting sprockets 243 and 244 on its opposite ends. A pair of guide wheels 246 and 247 is also mounted on opposite ends of the shaft 242 adjacent the outer sides of the sprockets 243 and 244 and serve as guides for electrode carrying chains 248 and 249 hereinafter described. Guide wheel 247 is provided with an extension 251 which has formed therein slot 252 which is adapted to be engaged by the extension 164a of the Geneva member 164. Thus, when the Geneva member 164 is driven as hereinbefore described, the shaft 242 and the sprockets 243 and 244 carried thereby will be rotated.

The shaft 242 is adapted to be moved into and out of engagement with the Geneva member 164 by springing the supporting arm 236 to the left as viewed in Figure 13 and then swinging the supporting arm 236 and the shaft 242 carried thereby away from the machine about the lower pivotal mounting for the supporting arm 236 until further movement is restrained by a chain 253 which has one end connected to the arms 237 and 238 as shown and the other end connected to the cabinet. In this position of the supporting arm, the electrode carrying chains 248 and 249 carried by the sprockets 243 and 244 may be readily replaced. After they have been replaced, the supporting arm 236 may be swung back into position and again sprung to the left and then released so that it engages the Geneva member 164.

A contact and probe holder 256 is mounted in the cabinet so that it immediately overlies the shaft 242 when the extension 251 is in engagement with the Geneva member 164. The holder consists of a block 257 of suitable insulating material such as "Micarta." The block is mounted upon an L shaped support 258, one leg of which serves as a stop for the upper end of the supporting arm 236 to limit rearward movement of the upper end of the supporting arm. The L shaped support is fixed to the cabinet by suitable means (not shown).

The probe 261 is mounted in the block 257 equidistant from the ends of the block and projects vertically from the block. The probe contains two resistors (resistors R3 and R4 for the left side or resistors R12 and R13 for the right side) which are electrically connected to certain components hereinafter described by conductor 262.

A pair of contact members 263 are mounted in recesses 264 provided on opposite sides of the block 257. The contact members 263 are formed of a suitable springy conducting material and are connected to circuitry hereinafter described by conductors 266.

The contact members 263 are adapted to engage fork-like electrodes which are carried by the endless chains 248 and 249. The electrodes for the left assembly will be termed left cooking electrodes CE1, and the electrodes for the right assembly will be termed CE2. The endless chains 248 and 249 hang from the sprockets 243 and 244 and are of conventional construction. The chains are formed of links 269 which are separated by spacers 271 and fastened together by rivets 272 (Figure 15). As shown, a fork-like electrode is mounted on every other link in the chain. Each fork-like electrode consists of a plate-like member 273 of conducting material which is formed with a plurality of sharp projecting prongs or tines 274 as shown in the drawing. The lower base-like portion of the plate-like member 273 is mounted between two members 276 and 277 of suitable insulating material such as "Micarta." A contact plate 278 is mounted on the outer surface of insulating member 276 and is provided with two portions 279 which extend at right angles to the plane of the contact plate and through a pair of holes 281 in the member 276 to engage a pair of balls 282. The projecting portions 279 serve to urge the balls 282 into engagement with the base portion of the plate-like member 273 to form electrical contacts between the plate-like member 273 and the contact plate 278. A pin 283 is recessed within the member 277 and extends through the plate-like member 273 and through the member 276 to maintain the alignment of the plate-like electrode or member 273 with respect to the members 276 and 277. The members 276 and 277 are secured to the rivets 272 of the chain by adapter plates 284. The adapter plates are secured to the members 276 and 277 by pins 286.

The contact plate 278 carried by each of the fork-like electrodes is adapted to engage the contact members 263 provided on the contact and probe holder 256 for a purpose hereinafter described.

*Circuit diagram in Figure 26*

The circuit diagram is shown in Figure 26 of the drawing and includes certain electrical components which have already been described and certain additional electrical components, all of which are listed below. The additional electrical components which previously have not been described are mounted on a panel board (not shown) in the rear of the cabinet. To facilitate a description of the circuit diagram, the function of the various components is given in the chart below:

A—electrical components of the advertising display.
B—electrical components for the animated display mechanism 47.
C—electrical components of refrigeration unit 27.
D—cyclometer or counter.
C1—capacitor-time delay for release of pilot relay.
C2—capacitor-time delay for release of left oven motor relay.
C3—capacitor-time delay for release of right oven motor relay.
CE1—left cooking electrodes.
CE2—right cooking electrodes.
M1—elevator motor.
M2—left transfer motor.
M3—left oven motor.
M4—right oven motor.
M5—right transfer motor.
L1—sold out indicator lamp.
L2—ready again indicator lamp.
L3—heating indicator lamp.
R1—left oven heater.
R2—right oven heater.
R3—left probe termistor.
R4—left "Sensitrol" probe lead compensating resistor.
R5—left balancing potentiometer.
R6—upper left bridge arm resistor.
R7—lower left bridge arm resistor.
R8—current limiting resistor.
R9—lower right bridge arm resistor.
R10—upper right bridge arm resistor.
R11—right bridge balancing potentiometer.
R12—right "Sensitrol" probe lead compensating resistor.
R13—right probe thermistor.
RY1—sold out relay.
RY2—pilot relay.
RY3—starter relay.
RY4—side selector relay.
RY5—elevator bypass relay.
RY6—elevator relay.
RY7—left indicator relay.
RY8—right indicator relay.
RY9—left transfer relay.
RY10—right transfer relay.
RY11—left oven relay.
RY12—right oven relay.
RY13—left power relay.
RY14—right power relay.
RY15—left cooking relay.
RY16—right cooking relay.
RY17—left "Sensitrol" relay.
RY18—right "Sensitrol" relay.
RY19—left current relay.
RY20—right current relay.
RY21—right time delay relay.
RY22—left time delay relay.

S1—reset switch.
S2—coin actuated switch.
S3—left empty elevator switch.
S4—right empty elevator switch.
S5—left elevator bypass switch.
S6—right elevator bypass switch.
S7—left elevator limit switch.
S8—right elevator limit switch.
S9—left indicator switch.
S10—right indicator switch.
S11—left transfer switch.
S12—right transfer switch.
S13—left oven starting switch.
S14—left oven limit switch.
S15—right oven starting switch.
S16—right oven limit switch.
S17—left power switch.
S18—right power switch.
S19—left "Sensitrol" switch.
S20—right "Sensitrol" switch.
S21—left time delay switch.
S22—right time delay switch.
SEL1—rectifier for 24 volt D.C. supply.
SEL2—rectifier for 117 volt D.C. supply.
SEL3—rectifier for "Sensitrol" 24 volt D.C. supply.
SOL1—left transfer solenoid.
SOL2—right transfer solenoid.
SOL3—coin collecting solenoid.
SOL4—left "Sensitrol" solenoid.
SOL5—right "Sensitrol" solenoid.
T2—117/24 volt A.C. transformer.
T3—240/24 volt A.C. transformer.
TC—1A and 1B—main switch thermal cut outs.
TC2—thermal cut out for excess temperature.
TC3—thermal cut out for left oven heater.
TC4—thermal cut out for right oven heater.

The electrical components shown in the circuit diagram in Figure 26 are connected to a suitable power supply such as 240 volts A.C. 60 cycle through the plug 291. One leg of the 240 volt supply is designated as bus 292, and the other leg is designated as bus 293. The neutral leg is designated as the neutral bus 294. Buses 296 and 297 designate the 24 volt A.C. supply which is supplied by the transformer T2. The bus 296 is also the negative side and bus 298 is the positive side of the 24 volt D.C. supply from the rectifier SEL1. Bus 299 is the positive side and neutral bus 294 is the negative side of the 117 volts D.C. supplied by rectifier SEL2.

The above listed components of the circuit diagram are conventional and are well known to those skilled in the art. The "Sensitrol" relays are a Model 705 manufactured by Weston, the operation of which is hereinafter described in detail.

*Operation of the dispensing machine*

Let it be assumed that all the magazine retainers 71 on the right and left hand elevators have been filled with magazines 73 and that the magazines 73 have previously been filled with the commodity to be dispensed. For purposes of illustration, it has been assumed that the magazines have been filled with frankfurters 306 which have been inserted in split buns 307 and that the buns with the frankfurters have been inserted into suitable paper bags 308 such as ones of wax paper.

The elevators may be filled merely by shifting the elevators upwardly in a clockwise direction which action is permitted by the ratchet clutch 98 hereinbefore provided in the drive mechanism for the elevators. Even though the elevators are shifted in this manner during loading, the elevators will always be in the proper timed relationship as hereinafter described.

It will be noted that the connection of the plug 291 to the A.C. supply will cause operation of the components represented by the blocks A, B and C. Thus, the refrigeration unit is in operation as soon as the plug 291 is connected.

Let it also be assumed that the dispensing machine has been connected to the power supply for a sufficient length of time so that the refrigeration system 27 can reduce the temperature within the cabinet 11 below the temperature setting of the thermal cut out TC2. The thermal cut out TC2 has been provided to prevent operation of the machine in the event that temperature within the cabinet rises to a temperature which permits spoilage of the commodity being dispensed. The thermal cut out switch TC2 is normally open and only closes when the temperature becomes too high in the cabinet. Thus, when the machine has started in operation and the temperature is too high, the sold out relay RY1 is released by energization of the release winding b of relay RY1 placing the winding b across the buses 293 and 294. The release of relay RY1 closes its contacts 1 and 2 which places the sold out lamp L1 across buses 293 and 294 to cause lighting of the lamp. Thus, if the machine is started when the temperature is too high within the cabinet, the sold out light L1 will be lit and operation of the machine will be prevented because contacts 4 and 5 of relay RY1 are opened.

When the sold out lamp L1 is lit by operation of the thermal cut out TC2, the relay RY1 must be mechanically reset by opening the door 12 and then closing it again. A lever (not shown) is provided which is operated by the door which operates switch S1 thereby energizing the *a* winding to reset relay RY1. However, the opening and closing of the door should not be done until the operator is relatively sure that the temperature within the cabinet is below that set for the thermal cut out TC2.

Contacts 2 and 3 are provided on the sold out relay RY1 to prevent collection of coins when the machine is sold out. Thus, when the sold out relay RY1 is released, contacts 2 and 3 are opened which prevent energization of solenoid SOL3. Deenergization of solenoid SOL3 prevents collection of coins in coin collectors of the type well known to those skilled in the art. The circuit for normally energizing the solenoid SOL3 and the cyclometer D is completed from the bus 293 through contacts 2 and 3 of relay RY1, contacts 3 and 4 of relay RY3, solenoid SOL3 to bus 294. The same circuit is used for energizing the cyclometer D. The cyclometer D is used for counting the number of dispensing operations performed by the machine.

As hereinbefore described, the switch S2 is a part of the coin receiving apparatus within the cabinet and its operation is well known to those skilled in the art. Thus, when the proper coin or number of coins has been received by the machine, switch S2 which will be termed the coin switch will be operated to energize the winding of the pilot relay RY2. This circuit is completed from bus 296 through the winding of relay RY2, contacts of switch S2, normally open contacts 4 and 5 of relay RY1, contacts 1 and 2 or 2 and 3 or relay RY4 depending upon the side which has been selected by the side selector relay RY4 as hereinafter described, contacts 1 and 2 of relay RY7 or RY8 depending upon the side selected to bus 298.

The condenser C1 is normally charged with 24 volts D.C. through normally closed contacts 3 and 4 of relay RY2. Thus, when contacts 4 and 5 of relay RY2 are closed upon energization of the winding of relay RY2, the charge across the condenser C1 is placed across the winding of the relay RY2 and serves to hold the winding of the relay RY2 energized for a sufficient period of time to insure operation of the relay RY3.

Closing contacts 1 and 2 of relay RY2 energizes the winding for the starter relay RY3. This circuit is completed from the neutral bus 294 through the winding of relay RY3, contacts 1 and 2 of relay RY2 to bus 293.

The pilot relay RY2 has been provided because the current which can be passed through the coin switch S2 is so small that it is difficult to obtain reliable operation of the starter relay RY3.

Closing of contacts 3 and 4 of the starter relay RY3 energizes the solenoid SOL3, the coin collecting solenoid, and the counter or cyclometer D. This circuit is completed from bus 293 through contacts 2 and 3 of relay RY1, contacts 3 and 4 of relay RY3, through the solenoid SOL3 and through the counter D to bus 294.

*Operation of transfer mechanism*

Closing of contacts 1 and 2 of relay RY3 serves to energize either one of the transfer solenoids SOL1 or SOL2 depending upon the side selected by the side selector relay RY4. If it is assumed that the left hand side has been selected, SOL1 will be energized. The circuit is completed from bus 293 through contacts 1 and 2 of RY3, contacts 4 and 5 of side selector relay RY4, the winding of solenoid SOL1 to bus 294. Hereafter, since it has been assumed that the left dispensing assembly has been selected, only the operation of the left assembly will be described. The operation of the right dispensing assembly is very similar to the left and for that reason will be omitted.

Energization of the solenoid SOL1 mechanically closes switch S11 by engaging the operating lever 133 as shown in Figure 6 of the drawing. Operation of the solenoid SOL1 also retracts the pawl 131 to permit rotation of the disc 117.

Operation of switch S11 energizes the winding for the left transfer relay RY9. This circuit is completed from bus 294 through the winding of relay RY9 through switch S11 to bus 292.

Energization of relay RY9 closes its contacts 1 and 2 which energizes the left transfer motor M2 by placing the motor across buses 292 and 294. The switch S11 is held in a closed position until the end of the transfer operation as hereinafter described.

Operation of the motor M2 causes rotation of the disc 117 and movement of the crank arm 118 to cause vertical downward movement of the rack 119 which causes rotation of the pinion 121 and the spindle 122. Rotation of the spindle 122 causes movement of the pusher plate 124 into the magazine 73 to push the frankfurter and bun with wrapping thereon through the opening 111 in the partition 23 onto the adjacent horizontal oven platform 187. As soon as the frankfurter and bun with wrapping thereon have been pushed completely onto the oven platform, the pusher plate 124 is retracted by movement of the disc 117 until the disc 117 returns to its home position where the notch 129 is engaged by the pawl 131 to prevent additional rotation of the disc 117. Engagement of the pawl 131 with the notch 129 permits switch S11 to open which de-energizes the left transfer motor M2.

As hereinbefore explained, the left transfer motor M2 also drives a disc 137 which is provided with two notches 138 and 139 which are adapted to be engaged by the operating lever 141 of a switch S5. It is readily apparent that for each operation of the left transfer motor M2, the switch S5 will be operated twice. The left oven starting switch S13 is also operated each time the left transfer motor M2 is operated by the pin 142 carried by disc 137 which engages the operating lever 143 of the switch S13.

Upon operation of motor M2, switch S11 is first operated, then switch S5 is operated once, switch S13 is operated and then switch S5 is operated a second time.

Switch S5 is utilized for energizing the winding of relay RY4. The circuit is completed from bus 294 through the winding of relay RY4 contacts of switch S5 to bus 293. The first energization of the winding of relay RY4 serves to move the relay RY4 to an intermediate position in which none of the contacts are closed. The second time the switch S5 is closed, the relay RY4 is moved to the next position in which it is assumed that contacts 2 and 3 and 5 and 6 of relay RY4 are closed.

Between the two closings of switch S5, the switch S13 is closed to start downward movement of the oven cover 194. The first thing that occurs is that the winding of relay RY11 is energized by closing of the switch S13. This circuit is completed from a neutral bus 294 through the winding of relay RY11 through switch S13 to bus 299.

Thus, switch S13 serves to place 117 volts D.C. across the winding of relay RY11. When relay RY11 is de-energized, 117 volts D.C. is normally placed across the capacitor C2 through normally closed contacts 3 and 4 of relay RY11. As soon as relay RY11 is energized, the charge on capacitor C2 is placed across the winding of relay RY11 to provide a time delay to insure that the oven limit switch S14 will be operated. The left oven limit switch S14 is of the normally closed type and is opened when the oven cover 194 is in its uppermost and lowermost position as hereinafter described. However, limit switches S14 and S16 are not actuated immediately upon energizing motors M3 or M4 because of the above mechanism involved.

Closing of contacts 1 and 2 of RY11 energizes the oven motor M3 by placing the oven motor M3 across buses 292 and 294.

Operation of the oven motor M3 causes rotation of the gearing connected thereto, as hereinbefore described.

Operation of the motor M3 causes rotation of disc 159 which carries pins 156 and 158. Upon movement of pin 158, as shown in Figure 19, the operating lever 160 for switch S14 is released to permit the switch S14 to return to its normally closed position to establish a holding circuit for relay RY11. The holding circuit is completed from bus 299 in a manner similar to that hereinbefore described, except through switch S14 rather than through S13. The relay RY11 remains energized until the operating lever 160 of switch S14 is engaged by pin 157 when the oven cover 194 reaches its lowermost limit.

Closing of the switch S5 also causes operation of the elevator bypass relay RY5. The circuit is completed from the neutral bus 294 to the winding of relay RY5 through switch S5 to bus 293. Relay RY5 is of such type that the movable contact 2 is normally moved to an intermediate position between contacts 1 and 3 upon the first energization of the winding. If it is assumed that contact 2 was in engagement with contact 3, upon the second energization of the winding of relay RY5 by switch 55 contacts 1 and 2 of RY5 will be closed.

Closing of contacts 1 and 2 of relay RY5 causes energization of relay RY6. This circuit is completed from neutral bus 294 to the winding of relay RY6 through contacts 1 and 2 of relay RY5 to a bus 293.

*Operation of elevator mechanism*

Energization of the winding of relay RY6 closes its contacts 1 and 2 which places the voltage between buses 293 and 294 across the motor M1.

Operation of the elevator motor M1 causes rotation of the worm 82 and the worm gear 83. The arrangement of the pins 87 and 88 on the driving disc 86 and the driven disc 87 determines whether the right or left hand elevator is operated. The pins 86 and 87 are so arranged that first one elevator is operated and then the next elevator is operated. Only one elevator is operated upon each operation of the elevator motor M1.

The timing between the transfer mechanism 18 and elevator mechanism 17 is such that when the left transfer mechanism is operated, the right elevator is operated and vice versa. Thus, since it has been assumed that the left transfer mechanism has been operated, the right elevator will be operated by the motor M1 when relay RY6 is energized by operation of relay RY5. Therefore, operation of the motor M1 causes the pin 87 to engage the next pin 88 on the driven disc 89 to rotate the elevators in a clockwise direction in a manner hereinbefore described. The driven disc 89 is only rotated through 120° because at that angular position of the driven disc 89, the pin 87 will become disengaged from the pin 88. This 120° rotation of the driven disc 89 is sufficient to move the next magazine 73 to the unloading position adjacent the unloading opening 111.

As soon as the motor M1 is operated, a holding circuit is established for relay RY6 through switches S7 and S8. If it is assumed that the left elevator was the last elevator operated, then the switch S7 will be moved to its normal position with its contacts 1 and 2 closed and its contacts 2 and 3 open as soon as the motor M1 operates to rotate the projection 106 caused by the disc 89 to allow the operating lever 107 to drop. The contacts of switch S8 will be in a closed position and will remain so until the operating lever 107 engages one of the projections 106 carried by the disc 89, at which time the contacts are opened to de-energize the winding for relay RY6. De-energization of relay RY6 de-energizes motor M1.

It should be pointed out that the projections 106 are spaced on the driven disc 89 in such a manner that the elevator is raised the desired amount before the elevator motor M1 is de-energized. The projections 106 are, therefore, placed on the driven disc 89 so that the operating lever for the switch S8 is engaged at the time the pin 87 becomes disengaged from the pin 88.

*Operation of oven mechanism*

When the oven cover is in its uppermost position, the catch 204 is in engagement with the operating lever 208 for the switch S9 as is shown in Figure 19. Switch S9 is of the normally closed type and in the position shown in Figure 19 is open.

The oven motor M3 is operated by energization of relay RY11 as hereinbefore described. As soon as rotation of the disc 171 is commenced by operation of the left oven motor M3, the crank arm 181 and the oven operating lever 201 are moved downwardly to cause the catch 204 to release the pin 202. Release of the catch 204 also releases the operating lever 208 of the switch S9 and allows the switch S9 to move to its normally closed position.

Closing of switch S9 causes energization of the winding for relay RY7. This circuit is completed from the neutral bus 294 through the winding of relay RY7, switch S9 through contacts 2 and 3 of relay RY1 to the bus 293.

The purpose of normally closed contacts 1 and 2 of relay RY7 and relay RY8 is to prevent the machine from accepting coins when the machine is busy.

Contacts 3, 4 and 5 on relays RY7 and RY8 have been provided for energizing the ready lamp L2 and the heating lamp L3. As shown, movable contact 4 of relay RY7 is connected to bus 292 whereas contact 3 is connected to one side of lamp L2 and the other side of lamp L2 is connected to the neutral bus 294. Thus, when both relays RY7 and RY8 are de-energized, the ready lamp L2 will be lit through the normally closed contacts 3 and 4 of each of the relays. It is also apparent that the ready lamp L2 will be lit when either one of the relays RY7 or RY8 is de-energized. If the ready lamp L2 is lit, it indicates that the machine is ready for at least one additional cooking operation, or possibly two cooking operations depending upon whether one or both of the relays RY7 and RY8 are de-energized. As soon as one of the relays RY7 or RY8 is energized, the heating lamp L3 will be lit by the closing of normally open contacts 4 and 5 of either the relay RY7 or the relay RY8. This indicates that at least one and possibly two of the ovens are in use.

The next thing that occurs upon lowering the oven cover after release of the catch 204 is that the oven operating lever 201 passes by the pawl 209 as shown in Figure 21 and then the portion 201b of the oven operating lever 201 engages the pawl 214 to cause operation of the left "Sensitrol" switch S19 which is normally open. Operation of the "Sensitrol" switch S19 causes energization of the solenoid SOL4. This circuit is completed from bus 298 through switch S19 through the winding of the solenoid SOL4 to bus 296. The solenoid SOL4 is a part of the "Sensitrol" unit manufactured by Weston as hereinbefore described. The solenoid SOL4 kicks the needle of the "Sensitrol" unit which in effect opens the contacts 1 and 2 of relay RY17 which is also a part of the "Sensitrol" unit. The winding of the relay RY17 forms a part of the Wheatstone bridge which is hereinafter described.

Current is normally flowing in the winding of the relay RY17 and because of the unbalanced condition of the Wheatstone bridge, however, this current is insufficient to pull the needle of the "Sensitrol" unit over so the needle must actually be kicked over by the solenoid SOL4. However, when the needle has been kicked over by the solenoid SOL4, the needle will be held in the kicked-over position by the winding of relay RY17 and which in effect maintains contacts 1 and 2 of the relay RY17 in an open position. The needle remains in this position until the current flowing in the relay RY17 drops to zero in a manner hereinafter described, at which time the needle will return to its initial position to close contacts 1 and 2.

After the left "Sensitrol" switch S19 has been operated, the oven cover 194 and the oven operating lever 201 continue to move downwardly. The jaws 201a and 201b of the oven operating lever engage the operating lever 218 for the switch S17 to close the normally open switch S17. Closing of switch S17 causes energization of the winding for relay RY13. This circuit is completed from the neutral bus 294 through the winding of relay RY13 through switch S17 to bus 293.

It should be pointed out that the heating units 198 for each of the oven covers 194 are represented by resistances R1 and R2. When the machine is not in operation, the oven heaters R1 and R2 are supplied with 110 volts by being connected across buses 292 and 294 by normally closed contacts 1 and 2 of relays RY13 and RY14. However, as soon as the relay associated with the oven heater is operated, 220 volts is applied to the oven heater. Thus, when RY13 is operated, closing of contacts 2 and 3 removes 110 volts from the oven heater R1 and places 220 volts on the oven heater R1 by placing the oven heater R1 across buses 292 and 293. The 220 volts supplied to the oven heater makes possible rapid heating and maintenance of the desired temperature. The thermal cutouts TC3 and TC4 serve to prevent the oven from getting too hot.

As the oven cover 194 moves downwardly, it extends over and engages the package containing the frankfurter and bun and pushes the oven platform 187 downwardly against the tension of spring 189. The oven platform is pushed down over the pair of fork-like electrodes CE1 which are already in a vertical position through openings (not shown) in the bottom of the oven platform. As the oven cover and the oven platform are moved downwardly, the fork-like electrodes pierce the opposite ends of the package, the bun and the frankfurter, as shown, particularly in Figure 14.

Closing of contacts 4 and 5 of relay RY13 applies 220 volts to the fork-like electrodes CE1. The circuit is completed from bus 293 through contacts 4 and 5 of relay RY13 through normally closed contacts 1 and 2 of RY15 through one cooking electrode CE1 and through the frankfurter to the other cooking electrode CE1 through the winding of current relay RY19, contacts 3 and 4 of RY15 to bus 292 or the other side of the 220 volt supply.

Contacts 6 and 7 of relay RY13 are provided for the purpose hereinafter described.

Just before the oven platform 187 reaches the lowermost limit of its travel by movement of the oven cover 194, the operating lever 232 of the switch S21 is released by the slide 224 which is moved downwardly by the rectangular washer 229. This permits closing of the normally closed switch S21 which energizes the winding of the time delay relay RY21 by placing the winding of the relay across buses 293 and 294.

The next that occurs is that the oven limit switch S14 is operated by the pin 157 carried by the disc 159 which during the sequence of operation, as hereinbefore described, has rotated through one-half a revolution. Operation of the switch S14 opens its normally closed contacts which de-energizes the winding for relay RY11. De-energization of relay RY11 opens its contacts 1 and 2 which de-energizes the left oven motor M3. At the same time, the pawl 174 engages the notch 172 and the disc 171 and prevents overrun of the disc 171.

During lowering of the oven cover 194 and the oven platform 187, the probe 261 also enters through the platform through an opening (not shown) provided in the platform and into the package containing the bun and frankfurter and extends upwardly into the frankfurter for a substantial distance as shown, particularly in Figure 14. The probe 261 has been so located that it is exactly midway between the two fork-like electrodes CE1 to obtain an average heat for the frankfurter.

The frankfurter starts to cook as soon as the 220 volts is applied across the electrodes CE1. The resistance of the meat particles and other substances determines the rate of heating the frankfurter. The rate of heating is not uniform for all frankfurters because of the great variations in the ingredients in the frankfurters.

As soon as the frankfurter starts cooking and sufficient current is passing through the frankfurter and through the winding of the current relay RY19, it opens its normally closed contacts 1 and 2 which permits continuation of the heating of the frankfurter. However, if for some reason no frankfurter should become lodged on the electrodes CE1 or a poor contact is established in the frankfurter, the contacts 1 and 2 of the current relay RY19 will not be opened and a circuit will be completed as soon as the contacts 1 and 2 of the time delay relay RY21 are closed to complete a circuit which energizes the winding of relay RY15. This causes removal of 220 volts from the electrodes CE1 and other operation hereinafter described.

The application of 220 volts to the cooking electrodes CE1 cooks the frankfurter and causes the temperature of the frankfurters to rise. Cooking of the frankfurter continues until it reaches the predetermined temperature for which the probe 261 has been set. For example, it has been found that the optimum temperature is approximately 160° F. However, satisfactory results can be obtained with temperatures ranging from 140° to 170° F.

When the frankfurter reaches the temperature for which the probe 261 has been set, the Wheatstone bridge to which the probe is connected is balanced and the current flowing in the winding of relay RY17 drops to zero. The components of the Wheatstone bridge as shown in Figure 26 are connected to the probe 261 for the left dispensing assembly. In Figure 27 the components are shown connected in the conventional Wheatstone arrangement to facilitate understanding of the operation of the network.

When the current in the winding of relay RY17 drops to zero, the needle of the "Sensitrol" unit returns to its home position to close its contacts 1 and 2.

The resistance R3 represents the thermistor in the left dispensing assembly. The resistance R3 varies as the temperature of the thermistor is changed. Until the resistance R3 has reached the proper value, the bridge will not be balanced.

Closing of contacts 1 and 2 of the "Sensitrol" relay RY17 energizes the winding for relay RY15. This circuit is completed from bus 297 through contacts 6 and 7 of relay RY13, contacts 1 and 2 of relay RY17, the winding of relay RY15 to bus 296.

As hereinbefore explained, the relay RY15 can also be energized by closing of the contacts 1 and 2 of the time delay relay of RY21. In this case the circuit for energizing the winding of relay RY15 is completed through contacts 1 and 2 of relay RY21 rather than through the contacts of relay RY17.

Energization of relay RY15 opens its contacts 1 and 2, and 3 and 4 to remove the 220 volts from both of the cooking forks CE1.

The closing of contacts 5 and 6 of relay RY15 energizes relay RY11. This circuit is completed from bus 299, through contacts 5 and 6 of relay RY15 through the winding of relay RY11 to ground or the neutral bus 294.

Energization of relay RY11 closes its contacts 1 and 2 and 4 and 5 and opens its contacts 3 and 4 to cause operation of the oven motor M3 in a manner similar to that hereinbefore described.

Upon initial operation of the motor M3, the disc 171 is rotated to cause the pawl 174 to release the notch 172. At the same time the disc 159 is rotated to move the pin 157 out of engagement with the operating lever for the switch S14 to permit closing of switch S14. Closing of the switch S14 establishes a holding circuit for relay RY11 as hereinbefore described.

The oven cover 194 is moved upwardly by the action of the crank arm 181 attached to the disc 171. As the oven cover is moved upwardly, the oven platform 187 moves upwardly with the oven because it is carried upwardly by the action of the spring 189. Upward movement of the oven platform 187 continues until the extension 187a engages the block 192. The oven platform 187 remains in this loading position.

As the oven cover 194 is moved upwardly, the power switch S17 is released which de-energizes the winding for relay RY13 which removes the 220 volts from the oven heater R1 and applies 110 volts to the oven heater.

It should be pointed out that contacts 5 and 6 of the cooking relay RY15 actually bridge the limit switch S14 to permit starting of the oven motor M3 when upward movement of the oven is desired. On downward movement, the oven starting switch S13 bridges the limit switch S14 as hereinbefore described. Thus, as soon as the oven moves from its lowermost position, the limit switch S14 is able to take control of limiting the movement of the oven.

On continued upward movement of the oven cover 194 and the oven operating lever 201, the switch S19 is not operated because the pawl 214 is a one-way pawl and when the operating member 201 engages the pawl in upward movement, the pawl 214 is merely flipped upwardly and switch S19 is not operated.

Further upward movement of the operating lever 201 and the oven cover 194 continues and the projecting portion 201a passes by the lower end of the pawl 209 until the projecting portion 201b engages the lower end of the pawl 209, as shown in Figure 24. Engagement of the projecting portion 201b with the pawl 209 causes the oven cover 194 to be swung to the right as viewed in Figure 24 about the oven supporting rod 183 to toss the cooked frankfurter, heated bun and the wrapper into the chute 34 in the door. During downward travel of the frankfurter and bun in the chute, the weight of the frankfurter and bun opens the trap door 40 to permit the frankfurter and bun to drop into the receptacle 37 where it may be picked up by the person who placed the coins in the machine.

Upward movement of the oven cover 194 continues and the projecting portion 201b will trip free of the pawl 209 to permit the oven cover 194 to swing back to a vertical position by force of gravity and by action of the spring 203. The stop 201c prevents travel of the oven cover beyond the vertical position.

Continued upward movement of the oven cover 194 moves the pin 202 into engagement with the catch 204 and moves the catch 204 upwardly. The catch 204 serves to prevent further swinging movement of the oven cover.

When the oven cover comes to its uppermost position, the pin 158 carried by the disc 159 operates the operating lever of the switch S14 which de-energizes the holding circuit for relay RY11 which opens the circuit to the oven motor M3. The latch or pawl 174 engages the notch 173 and the disc 171 to prevent overrun.

The upward movement of the catch 204 operates the indicating switch S9 to open switch S9 which is a part of the control for the lamps L2 and L3 as hereinbefore described.

*Operation of electrode mechanism*

During upward movement of the oven cover, the disc 159 is rotated to bring the tooth 162 into engagement with the notch 163 and the Geneva member 164 to cause rotation of the Geneva member 164 as shown in Figure 24 to cause the set of cooking electrodes previously used for cooking the last frankfurter and for moving a new set of cooking electrodes into a vertical position where they will be in a position in which the oven platform and the next frankfurter may be lowered onto the cooking electrodes.

It will be noted that the disc 159 rotates only once each raising and lowering of the oven cover 194 and for that reason the electrodes are only changed when the oven platform 187 has been moved into engagement with the stop 192 and the oven cover is being raised.

Sufficient cooking electrodes are normally provided so that there is a different set of cooking electrodes for each magazine in the associated elevator.

As hereinbefore explained, the fork-like electrodes are mounted on the endless chains 248 and 249 which may be readily removed from the sprockets 243 and 244 by swinging the supporting arm 236 out of engagement with the Geneva member 164. It is generally desirable to place new sets of clean forks in the machine each time the machine is filled with frankfurters.

Heretofore we have described only the operation of the left hand dispensing assembly. The operation of the right hand dispensing assembly is substantially identical. From the circuit diagram it is readily apparent that two frankfurters can be cooked at the same time. If frankfurters are being cooked in both ovens, the ready lamp L2 will not be lit and the heating lamp L3 will be lit. When only one frankfurter is being cooked and the bun being heated, both the heating lamp and the ready lamp L2 and L3 will be lit.

It is also apparent from the circuit diagram that first the left hand dispensing assembly will be operated, and then the right hand dispensing assembly. This sequence continues until the machine is emptied. The switches S3 and S4 provided in the door continually feel the magazines by extending into the slots 76 provided in the magazines to determine whether each is filled with a frankfurter and bun. When there is no frankfurter within the magazine, the switch will close. When all the magazines in both elevators are empty, both switches S3 and S4 are closed which complete the circuit for energizing the release coil *b* of relay RY1. This causes closing of contacts 1 and 2 of relay RY1 to energize the sold out lamp L1. When this occurs as hereinbefore described, the door of the machine must be opened to mechanically operate switch S1 to energize winding *a* to reset the relay RY1.

In Figure 28, the circuit diagram of another embodiment of our invention is shown. The primary change in this embodiment of our invention is a change in the timing so as to prevent damage to the machine in the event the machine is put out of time when being operated by hand for testing purposes. The revised circuitry also serves to prevent mis-timed operation from accidental mechanical or electrical operation of the side elevator relay RY4.

The circuit diagram in Figure 28 has been changed from that of Figure 26 in that the elevator bypass relay RY5 has been omitted and the time relay RY23 which may be termed a starter holding relay, has been added. In addition, contacts 3 to 8 have been added to relay RY9, and contacts 3 to 8 have been added to relay RY10. Switches S23 and S24 have been added and may be termed transfer safety and elevator safety switches respectively. The switches S23 and S24 are of the normally open type but are normally held in a closed position by the door 12 and will only move to an open position when the door is opened. An additional pair of contacts 5 and 6 has been added to relay RY3, and a pair of left and right gating rectifiers SEL4 and SEL5 has been added.

In order to simplify the description of the operation of the machine with the circuit diagram as shown in Figure 28, only those portions of the operation which differ from those described in conjunction with Figure 26 will herein be described.

As hereinbefore described, closing of contacts 1 and 2 of the pilot relay RY2 energizes the winding of the starter relay RY3. This circuit is completed from the neutral bus 294 through the winding of relay RY3, contacts 1 and 2 of relay RY2, switch S24 to bus 299. Thus, it can be seen that the relay RY3 is energized by 117 volts D.C. from bus 299 rather than from 117 volts A.C. from bus 293 as in Figure 26. Direct current has been used to prevent undesirable feedback in circuits hereinafter described.

It will be noted that the winding of relay RY23 is in parallel with the winding of relay RY3 and that, therefore, relay RY23 will be energized at the same time that relay RY3 is energized. A holding circuit is established for relays RY3 and RY23 by the contacts 1 and 2 of relay RY23 and contacts 5 and 6 of relay RY2. This circuit is completed from a neutral bus 294 through the winding of relay RY23, contacts 1 and 2 of relay RY23, contacts 5 and 6 of relay RY3, switch S24 to bus 299. Thus, the relays RY23 and RY3 will remain energized until the time delay relay RY23 opens its normally closed contacts to de-energize the holding circuit.

The increased period of energization for relay RY3 makes possible the operation of the elevator mechanism as hereinafter described.

It will be recalled that in Figure 26 the energization of the starter relay RY3 actuated one of the transfer mechanisms depending upon the side selected by the side selector relay RY4. Operation of the transfer mechanism thereafter caused actuation of the elevator mechanism. However, in the embodiment shown in Figure 28, the starter relay RY3 serves to actuate the elevator mechanism and the elevator limit switches S7 and S8 assume the additional function of starting the operation of the transfer mechanisms. Since the transfer operation occurs after the movement of the elevator mechanism, side selection for operation of the transfer mechanisms becomes automatic. For that reason, the elevator bypass relay RY5 is no longer required and contacts 4, 5 and 6 of the side selector relay are also no longer required.

Therefore, upon operation of relay RY3, closing of its contacts 1 and 2 serves to energize the elevator motor M1 if there is no transfer operation in progress. The circuit is completed from the bus 299 carrying 117 volts D.C. through switch S24, contacts 1 and 2 of relay RY3, normally closed contacts 3 and 4 of relay RY9, normally closed contacts 3 and 4 of relay RY10, the winding of relay RY6, bus 294 to ground. Energization of the relay RY6 will cause energization of the elevator motor M1 in a manner hereinbefore described. If there is a transfer operation taking place, either relay RY9 or relay RY10 will be energized and its respective contacts 3 and 4 will be open preventing energization of relay RY6.

As also hereinbefore described, operation of the elevator motor M1 causes operation of the switches S7 and S8. As shown, one side of each of the switches is connected to the positive 117 volts on bus 299. The other sides of the switches S7 and S8 are connected to rectifiers SEL4 and SEL5 and the other sides of the rectifiers are connected to the winding for relay RY6. The rectifiers SEL4 and SEL5 are connected in such a manner that they will pass current from the switches S7 and S8 to the winding for relay RY6. Therefore, the limit switches S7 and S8 serve to control the elevator movement. The rectifiers SEL4 and SEL5 serve to prevent current from the limit switch which has just been operated from reaching the normally open contacts of the inoperative limit switch. In this way, the limit switches S7 and S8 perform both a separate function and a common function without interacting voltages.

A connection is made between one contact of switch S7 and contact 6 of relay RY9 and contact 5 of relay RY9 is connected to one side of left transfer solenoid SOL1.

It is therefore apparent that closing of the left elevator switch S7 causes energization of the left transfer relay RY9 by first causing energization of the solenoid SOL1. The solenoid SOL1 causes operation of the switch S11 which causes energization of the winding of relay RY9 in a manner hereinbefore described. As soon as relay RY9 is energized, contacts 5 and 6 of relay RY9 are opened to permit the left transfer switch S11 to assume control of the transfer operation.

The right elevator limit switch S8 has similar connections to contacts 5 and 6 of relay RY10 and solenoid SOL2 to cause operation of the right transfer relay RY9 when the switch S8 is closed.

Contacts 7 and 8 of relay RY9 and contacts 7 and 8 of relay RY10 have been placed in series with the coin switch S2 and, therefore, when a transfer operation is taking place, the coin switch S2 will be ineffective.

The side selector relay RY4 in this embodiment has lost the function for which it was originally named. However, it prevents a ready condition when an oven cover is down and the one up was the last one down, returning early because of no frankfurter or no contact with frankfurter. Therefore, this relay must still be correctly timed.

Switch S23 prevents operation of the transfer mechanism while the door is open so that when an elevator is raised by hand when loading the elevator no transfer will take place. Switch S24 similarly controls the elevator mechanism so that the elevators are not driven during loading of the elevators.

The remainder of the operation of the circuit shown in Figure 28 is identical to that described for Figure 26.

It is apparent from the foregoing that we have provided a machine which automatically dispenses cooked frankfurters within heated buns. The frankfurters are cooked uniformly to a predetermined temperature and are not undercooked or overcooked. The frankfurters and buns within the machine are kept under refrigeration and clean cooking electrodes are utilized for cooking each frankfurter. The cooking electrodes are the only portions of the machine which come in contact with the frankfurter and bun. The wrapping paper around the frankfurter and bun serves to prevent the bun from coming in contact with the various parts of the oven. More than one frankfurter can be cooked at a time. Numerous safety devices have been placed in the machine to prevent faulty operation.

We claim:

1. In a dispensing machine for frankfurters in buns, a pair of spaced cooking electrodes, means to cause said electrodes to contact opposite ends of the frankfurter within the bun, means to apply a voltage to said electrodes to cause current to pass through the frankfurter, temperature responsive means to determine when said frankfurter has reached a predetermined temperature, means responsive to the temperature means for removing the voltage from said electrodes when said frankfurter has reached a predetermined temperature, means for heating the bun independent of heating of the frankfurter during the time voltage is applied to the electrodes, and means for moving the bun and the frankfurter out of contact with the electrodes and for discharging the bun and frankfurter.

2. In a dispensing machine for frankfurters with buns, a plurality of spaced pairs of cooking electrodes movable into a cooking position, oven means, means adapted to load the frankfurter and bun into said oven means, means to cause the pair of electrodes in cooking position to come into engagement with the opposite ends of the frankfurter within the bun, means to apply a voltage to said electrodes to cause current to pass through the frankfurter, temperature responsive means to determine when said frankfurter has reached a predetermined temperature, means to apply heat to the oven means during the time the voltage is applied to said electrodes independent of heating of the frankfurter, means responsive to said temperature responsive means for removing the voltage from said electrodes when said frankfurter has reached said predetermined temperature, and means adapted to move the frankfurter and bun out of contact with the electrodes and discharge the frankfurter and bun.

3. A machine as in claim 2 wherein said oven means includes an oven platform and an oven cover, said oven cover and oven platform being movable relative to each other.

4. A machine as in claim 2 together with current responsive means connected to said electrodes, and means responsive to the current means to remove the voltage from said electrodes when the current passing through said frankfurter is below a predetermined value.

5. A machine as in claim 4 together with time delay means to prevent the operation of the said means responsive to the current responsive means before a predetermined time interval has elapsed.

6. A machine as in claim 2 together with means for moving the next pair of spaced electrodes into cooking position upon discharge of a frankfurter and bun.

7. In a dispensing machine for frankfurters with buns, a plurality of spaced pairs of cooking electrodes, each of said pairs of electrodes being movable into a cooking position, an oven platform movable from a loading position to a cooking position, an oven cover movable relative to said oven platform, elevating means, a plurality of removable magazines mounted on said elevating means, said magazines being adapted to be filled with frankfurters placed within buns, means to move said elevating means to successively place said magazines in an unloading position adjacent the oven platform, means adapted to unload the frankfurter and bun from the magazine in the loading position and placing the frankfurter and bun on the oven platform, means to move said oven cover onto said frankfurter and bun and into engagement with the oven platform and thereby being adapted to cause the frankfurter within the bun to be moved into engagement with the pair of electrodes in cooking position, means to apply a voltage to said electrodes to cause current to pass through the frankfurter, temperature responsive means to determine when said frankfurter has reached a predetermined temperature, means to apply heat ot said oven cover during the time a voltage is applied to said pair of spaced electrodes in cooking position, means responsive to the temperature means for removing the voltage from said electrodes when said frankfurter has reached said predetermined temperature, means adapted to remove the frankfurter out of engagement with the electrodes and to eject the cooked frankfurter and heated bun, and means to advance the next pair of spaced cooking electrodes into cooking position after removal of the cooked frankfurter.

8. A machine as in claim 7 wherein the magazines are open at both ends and wherein the means adapted to unload the frankfurther and bun from the magazine includes a reciprocating member which moves into and out of one open end of the magazine and is adapted to push the frankfurter and bun through the other open end of the magazine.

9. A machine as in claim 7 wherein said spaced pairs of cooking electrodes are mounted on a pair of endless members.

10. A machine as in claim 7 wherein said elevating means includes an endless member, and a plurality of U-shaped magazine retainers mounted on said endless member, the retainer being formed with a slot and wherein the magazine is provided with a pin adapted to engage the slot, the pin and the slot serving to facilitate alignment of the magazine and the retainer, the retainer releasably engaging the magazine.

11. A machine as in claim 9 wherein the endless members are mounted on sprockets which may be moved into and out of engagement with the electrode advancing means to facilitate replacement of the endless members carrying the electrodes.

12. In a dispensing machine for frankfurters with buns, a pair of dispensing assemblies, each dispensing assembly comprising a plurality of spaced pairs of cooking electrodes, each of said pairs of electrodes being movable into a cooking position, an oven platform movable from a loading position to a cooking position, an oven cover movable relative to said oven platform, elevating means, a plurality of removable magazines mounted on said elevating means, said magazines being adapted to be filled with frankfurters placed within buns, said elevating means being movable to successively place said magazines in an unloading position adjacent the oven platform, means adapted to unload the frankfurter and bun from the magazine in the loading position and to place the frankfurter and bun on the oven platform, means to move said oven cover onto said frankfurter and bun and into engagement with the oven platform and thereby being adapted to cause the frankfurther and bun to be moved into engagement with the pair of electrodes in cooking position, means to apply a voltage to said electrodes to cause current to pass through the frankfurter, temperature responsive means to determine when said frankfurter has reached a predetermined temperature, means to apply heat to said oven cover during the time the voltage is applied to said pair of spaced electrodes in cooking position, means responsive to temperature means for removing the voltage from said electrode when said frankfurter has reached said predetermined temperature, means adapted to move the frankfurter out of engagement with the electrodes and to eject the cooked frankfurter and heated bun, means to advance the next pair of spaced cooking electrodes into cooking position after removal of the cooked frankfurter, and means to synchronize operation of both dispensing assemblies.

13. A dispensing machine as in claim 12 together with means to cause synchronized operation of the elevating means for each dispensing assembly so that when one dispensing assembly is operated the elevating means for the other dispensing assembly is operated to move the next magazine in the elevating means to an unloading position.

14. A dispensing machine as in claim 12 together with means in each dispensing assembly to cause operation of the unloading means after the elevator means has been operated to move the next magazine to an unloading position.

References Cited in the file of this patent

UNITED STATES PATENTS

| | | |
|---|---|---|
| 1,776,901 | Essex | Sept. 30, 1930 |
| 2,200,405 | Watson | May 14, 1940 |
| 2,269,178 | Breneman | Jan. 6, 1942 |
| 2,287,956 | Aff | June 30, 1942 |
| 2,642,794 | Spiess | June 23, 1953 |
| 2,794,384 | Sierk | June 4, 1957 |
| 2,876,327 | Leisey | Mar. 3, 1959 |